United States Patent
Xie

(10) Patent No.: US 12,253,635 B1
(45) Date of Patent: Mar. 18, 2025

(54) LIDAR RANGE AND SPEED MEASUREMENT METHOD AND LiDAR

(71) Applicant: SUTENG INNOVATION TECHNOLOGY CO., LTD., Guangdong (CN)

(72) Inventor: Jinwen Xie, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/976,245

(22) Filed: Dec. 10, 2024

(30) Foreign Application Priority Data

Mar. 19, 2024 (CN) .......................... 202410312710.1

(51) Int. Cl.
*G01C 3/08* (2006.01)
*G01S 7/4911* (2020.01)
*G01S 17/34* (2020.01)
*G01S 17/58* (2006.01)

(52) U.S. Cl.
CPC ............. *G01S 7/4911* (2013.01); *G01S 17/34* (2020.01); *G01S 17/58* (2013.01)

(58) Field of Classification Search
CPC ......... G01S 7/4911; G01S 17/34; G01S 17/58
See application file for complete search history.

(56) References Cited

U.S. PATENT DOCUMENTS 11,650,316 B1 * 5/2023 Rezk ...................... G01S 7/4817
356/3
11,693,118 B1 * 7/2023 Nakamura .............. G01S 17/86
702/142

FOREIGN PATENT DOCUMENTS

CN         117590414 A  *  2/2024  ............. G01S 17/08

* cited by examiner

*Primary Examiner* — Mark Hellner
(74) *Attorney, Agent, or Firm* — Ladas & Parry LLP

(57) ABSTRACT

A LiDAR range and speed measurement method and a LiDAR, are disclosed. Through the technical solution provided by the embodiment of the present application, it is possible to determine whether Doppler aliasing occurs based on a first local oscillator signal generated by a first laser and a second local oscillator signal generated by a second laser, the first local oscillator signal including multiple segments of first continuous wave signals, the second local oscillator signal including multiple segments of second continuous wave signals, the second continuous wave signal including a first swept frequency signal and a first constant frequency signal. In the event of Doppler aliasing, a first algorithm is used to calculate the distance and/or speed of the target object relative to the LiDAR, thereby improving the accuracy of the LiDAR ranging and speed measurement.

13 Claims, 9 Drawing Sheets

LIDAR RANGE AND SPEED MEASUREMENT METHOD AND LiDAR

CROSS-REFERENCE TO RELATED APPLICATION

The present application claims the benefit of priority to Chinese Patent Application No. 202410312710.1, filed on Mar. 19, 2024, which is hereby incorporated by reference in its entirety.

TECHNICAL FIELD

The present application relates to the field of radar technology, and in particular to a LiDAR range and speed measurement method and a LiDAR.

BACKGROUND

Frequency Modulated Continuous Wave (FMCW) LiDAR has the advantages of strong anti-interference and higher signal-to-noise ratio, and has a good market prospect in the field of vehicle assisted driving systems.

FMCW LiDAR generates detection light and local oscillator light through the light source module, so as to detect the target object with the detection light, and use the local oscillator light as a local reference; where, the detection light and the local oscillator light are both FMCW and have the same time-frequency characteristics; the FMCW LiDAR receives the local oscillator light and the echo light formed by the detection light reflected by the target object through the photoelectric detection module for coherent mixing. There may be Doppler aliasing phenomenon, when the Doppler beat frequency is greater than the range beat frequency, the measured beat frequency will be mirrored to the positive frequency domain, thereby causing errors in the measured distance and speed.

SUMMARY

Embodiments of the present application provides a method for LiDAR distance measurement and speed measurement and a LiDAR, which can improve the accuracy of the measured distance and speed.

A method for LiDAR range and speed measurement is provided, the method comprising:
  controlling a first laser of the LiDAR to generate a first detection signal and a corresponding first local oscillator signal, wherein the first local oscillator signal includes multiple segments of first continuous wave signals, and the first continuous wave signal is a linear frequency sweep signal;
  controlling a second laser of the LiDAR to generate a second detection signal and a corresponding second local oscillator signal, wherein the second local oscillator signal includes multiple segments of second continuous wave signals, each segment of the second continuous wave signal corresponds to a segment of the first continuous wave signal in the time domain, the second continuous wave signal includes a first sweep frequency signal and a first constant frequency signal, the first sweep frequency signal and the corresponding first continuous wave signal have opposite sweep directions, and the first constant frequency signal exists between the first sweep frequency signals of two adjacent second continuous wave signals in the time domain;
  receiving a first echo signal, a second echo signal, the first local oscillator signal, and the second local oscillator signal, wherein the first echo signal is formed when the first detection signal is reflected by a target object, and the second echo signal is formed when the second detection signal is reflected by the target object;
  obtaining a first frequency and a second frequency, wherein the first frequency is the beat frequency of the first local oscillator signal in a first time zone, the second frequency is the beat frequency of the second local oscillator signal in the first time zone, and the first time zone is the time domain interval where the first frequency sweep signal is located;
  obtaining a third frequency and a fourth frequency, wherein the third frequency is the beat frequency of the first local oscillator signal in the second time zone, and the fourth frequency is the beat frequency of the second local oscillator signal in the second time zone, and the second time zone is the time domain interval where the first constant frequency signal is located;
  when the fifth frequency is less than the sixth frequency, then based on the seventh frequency, the eighth frequency and the sixth frequency, it is determined whether Doppler aliasing occurs in the beat frequency signal of the first local oscillator signal and the first echo signal, wherein the fifth frequency is one of the third frequencies, the sixth frequency is one of the fourth frequencies and corresponds to the same second time zone as the fifth frequency, the seventh frequency is located in a first time zone adjacent to the fifth frequency in the time domain, the seventh frequency has the same sweep direction as the fifth frequency, the eighth frequency has the same first time zone as the seventh frequency, and the eighth frequency has the opposite sweep direction as the fifth frequency;
  when Doppler aliasing occurs, the distance and/or speed of the target object relative to the LiDAR in the first time zone and/or second time zone is determined based on the fifth frequency, the sixth frequency, the seventh frequency, the eighth frequency and the first algorithm, wherein the first algorithm is configured to calculate the distance and/or speed of the target object relative to the LiDAR when Doppler aliasing occurs.

A LiDAR range and speed measurement device is provided, the device comprising:
  a first control module, used for controlling a first laser of the LiDAR to generate a first detection signal and a corresponding first local oscillator signal, wherein the first local oscillator signal includes multiple segments of first continuous wave signals, and the first continuous wave signal is a linear frequency sweep signal;
  a second control module is used to control the second laser of the LiDAR to generate a second detection signal and a corresponding second local oscillator signal, wherein the second local oscillator signal includes multiple segments of second continuous wave signals, each segment of the second continuous wave signal corresponds to a segment of the first continuous wave signal in the time domain, and the second continuous wave signal includes a first sweep frequency signal and a first constant frequency signal, the first sweep frequency signal and the corresponding first continuous wave signal have opposite sweep directions, and the first constant frequency signal exists between the first sweep frequency signals of two adjacent second continuous wave signals in the time domain;

a receiving module, configured to receive a first echo signal, a second echo signal, the first local oscillator signal, and the second local oscillator signal, wherein the first echo signal is formed by the first detection signal being reflected by a target object, and the second echo signal is formed by the second detection signal being reflected by the target object;

a first obtaining module is used to obtain a first frequency and a second frequency, wherein the first frequency is a beat frequency of the first local oscillator signal in a first time zone, the second frequency is a beat frequency of the second local oscillator signal in the first time zone, and the first time zone is a time domain interval where the first frequency sweep signal is located;

a second obtaining module is used to obtain a third frequency and a fourth frequency, wherein the third frequency is the beat frequency of the first local oscillator signal in a second time zone, and the fourth frequency is the beat frequency of the second local oscillator signal in the second time zone, and the second time zone is the time domain interval where the first constant frequency signal is located;

a judgment module, configured to determine whether Doppler aliasing occurs between the beat frequency signal of the first local oscillator signal and the first echo signal based on the seventh frequency, the eighth frequency and the sixth frequency if the fifth frequency is less than the sixth frequency, wherein the fifth frequency is one of the third frequencies, the sixth frequency is one of the fourth frequencies and corresponds to the same second time zone as the fifth frequency, the seventh frequency is located in a first time zone adjacent to the fifth frequency in the time domain, the seventh frequency has the same sweep direction as the fifth frequency, the eighth frequency has the same sweep direction as the seventh frequency, and the eighth frequency has the opposite sweep direction as the fifth frequency;

a determination module is used to determine the distance and/or speed of the target object relative to the LiDAR in the first time zone and/or the second time zone based on the fifth frequency, the sixth frequency, the seventh frequency, the eighth frequency and the first algorithm if Doppler aliasing occurs, wherein the first algorithm is configured to calculate the distance and/or speed of the target object relative to the LiDAR when Doppler aliasing occurs.

In an embodiment, the first local oscillator signal is a triangular wave frequency sweep signal, and the frequency sweep directions of two adjacent first continuous wave signals are opposite.

In an embodiment, a frequency of the first constant frequency signal is the same as a frequency of the frequency sweep end point of the first frequency sweep signal adjacent to the upstream in the time domain, and is the same as the frequency of the frequency sweep start point of the first frequency sweep signal adjacent to the downstream in the time domain.

In an embodiment, the judgment module is used to determine whether the similarity between the seventh frequency and the fifth frequency meets a preset condition if the fifth frequency is less than the sixth frequency; if the similarity between the seventh frequency and the fifth frequency meets the preset condition, then based on the seventh frequency, the eighth frequency and the sixth frequency, determine whether Doppler aliasing occurs in the beat frequency signal of the first local oscillator signal and the first echo signal.

In an embodiment, the judgment module is used to determine whether Doppler aliasing occurs in the beat frequency signal of the first local oscillator signal and the first echo signal based on the seventh frequency, the eighth frequency and the sixth frequency if the similarity between the seventh frequency and the fifth frequency meets a preset condition and the seventh frequency is less than the eighth frequency.

In an embodiment, the determination module is used to determine the distance and speed of the target object relative to the LiDAR in the second time zone based on the fifth frequency, the sixth frequency and the first target algorithm; and/or, to determine the distance and speed of the target object relative to the LiDAR in the first time zone based on the seventh frequency, the eighth frequency and the second target algorithm; wherein the first algorithm includes the first target algorithm and the second target algorithm, the first target algorithm is configured as an algorithm that can calculate the distance and/or speed of the target object relative to the LiDAR based on the fifth frequency and the sixth frequency when Doppler aliasing occurs, and the second target algorithm is configured as an algorithm that can calculate the distance and/or speed of the target object relative to the LiDAR based on the seventh frequency and the eighth frequency when Doppler aliasing occurs.

In an embodiment, the determination module is also used to determine the distance and/or speed of the target object relative to the LiDAR in the first time zone and/or second time zone based on the fifth frequency, the sixth frequency, the seventh frequency, the eighth frequency and the second algorithm if Doppler aliasing does not occur, wherein the second algorithm is configured to calculate the distance and/or speed of the target object relative to the LiDAR when Doppler aliasing does not occur.

In an embodiment, the device further includes a direction determination module for determining a direction of movement of the target object relative to the LiDAR based on a sweep direction corresponding to the fifth frequency, if the fifth frequency is less than the sixth frequency.

In an embodiment, the direction determination module is used to determine that the target object is close to the LiDAR if the direction corresponding to the fifth frequency is an upward sweep frequency direction; and to determine that the target object is far away from the LiDAR if the direction corresponding to the fifth frequency is a downward sweep frequency direction.

In an embodiment, the second obtaining module is further used to determine the third frequency based on the ninth frequency and the tenth frequency if the third frequency is not acquired; and/or determine the fourth frequency based on the eleventh frequency and the twelfth frequency if the fourth frequency is not acquired; wherein the ninth frequency is located in a first time zone upstream of the third frequency in the time domain, the ninth frequency has the same corresponding frequency sweeping direction as the third frequency, the tenth frequency is located in a first time zone downstream of the third frequency in the time domain, the tenth frequency has the same corresponding frequency sweeping direction as the third frequency; the eleventh frequency is located in a second time zone upstream of the fourth frequency in the time domain, and the twelfth frequency is located in a second time zone downstream of the fourth frequency in the time domain.

In an embodiment, the second detection signal includes a second sweep frequency signal corresponding to the first sweep frequency signal and a second constant frequency signal corresponding to the first constant frequency signal, and the device also includes a third control module, which is used to control the scanning module to scan the combined light signal of the first detection signal and the second detection signal in the first direction and the second direction to form a plurality of scanning trajectories extending along the first direction and arranged at intervals in the second direction, wherein the first direction intersects with the second direction; between two adjacent scanning trajectories, the direction angle of each second constant frequency signal in one of the scanning trajectories in the first direction is staggered with the direction angle of each second constant frequency signal in the other scanning trajectory in the first direction.

In an embodiment, the device further includes a sampling module for sampling the beat frequency signals corresponding to the first local oscillator signal and the second local oscillator signal, respectively, wherein the sampling rate or the number of FFT points of the beat frequency signal corresponding to the first local oscillator signal in the second time zone is smaller than that in the first time zone, and the sampling rate or the number of FFT points of the beat frequency signal corresponding to the second local oscillator signal in the second time zone is smaller than that in the first time zone.

A LiDAR is provided, the LiDAR comprising a first laser, a second laser, a photoelectric detection module and a data processing module;

the first laser is used to generate a first detection signal and a corresponding first local oscillator signal, wherein the first local oscillator signal includes multiple segments of first continuous wave signals, and the first continuous wave signal is a linear frequency sweep signal; the second laser is used to generate a second detection signal and a corresponding second local oscillator signal, wherein the second local oscillator signal includes multiple segments of second continuous wave signals, each of which corresponds to a first continuous wave signal in the time domain, and the second continuous wave signal includes a first frequency sweep signal and a first constant frequency signal, the first frequency sweep signal and the corresponding first continuous wave signal have opposite frequency sweep directions, and the first constant frequency signal exists between the first frequency sweep signals of two adjacent second continuous wave signals in the time domain;

the photoelectric detection module is used to receive a first echo signal, a second echo signal, the first local oscillator signal and the second local oscillator signal, wherein the first echo signal is formed by the first detection signal being reflected by a target object, and the second echo signal is formed by the second detection signal being reflected by the target object;

the data processing module is used to obtain a first frequency and a second frequency, wherein the first frequency is the beat frequency of the first local oscillator signal in the first time zone, the second frequency is the beat frequency of the second local oscillator signal in the first time zone, and the first time zone is the time domain interval where the first swept frequency signal is located; obtain a third frequency and a fourth frequency, wherein the third frequency is the beat frequency of the first local oscillator signal in the second time zone, the fourth frequency is the beat frequency of the second local oscillator signal in the second time zone, and the second time zone is the time domain interval where the first constant frequency signal is located; if the fifth frequency is less than the sixth frequency, then based on the seventh frequency, the eighth frequency and the sixth frequency, determine whether Doppler aliasing occurs between the beat frequency signals of the first local oscillator signal and the first echo signal, wherein the fifth frequency The frequency is one of the third frequencies, the sixth frequency is one of the fourth frequencies and corresponds to the same second time zone as the fifth frequency, the seventh frequency is located in the first time zone adjacent to the fifth frequency in the time domain, and the seventh frequency has the same sweep direction as the fifth frequency, the eighth frequency and the seventh frequency are located in the same first time zone, and the eighth frequency has an opposite sweep direction to the fifth frequency; if Doppler aliasing occurs, the distance and/or speed of the target object relative to the LiDAR in the first time zone and/or the second time zone is determined based on the fifth frequency, the sixth frequency, the seventh frequency, the eighth frequency and the first algorithm, wherein the first algorithm is configured as an algorithm that can calculate the distance and/or speed of the target object relative to the LiDAR when Doppler aliasing occurs.

A computer-readable storage medium is provided, in which at least one computer program is stored. The computer program is loaded and executed by a processor to implement the LiDAR range and speed measurement method.

A computer program product or a computer program is provided, which includes a program code, and the program code is stored in a computer-readable storage medium. A processor of a computer device reads the program code from the computer-readable storage medium, and the processor executes the program code, so that the computer device performs the LiDAR range and speed measurement method.

In the event of Doppler aliasing, the first algorithm is used to calculate the distance and/or speed of the target object relative to the LiDAR, thereby improving the accuracy of the LiDAR distance measurement and speed measurement.

DETAILED DESCRIPTION

Figure 1:
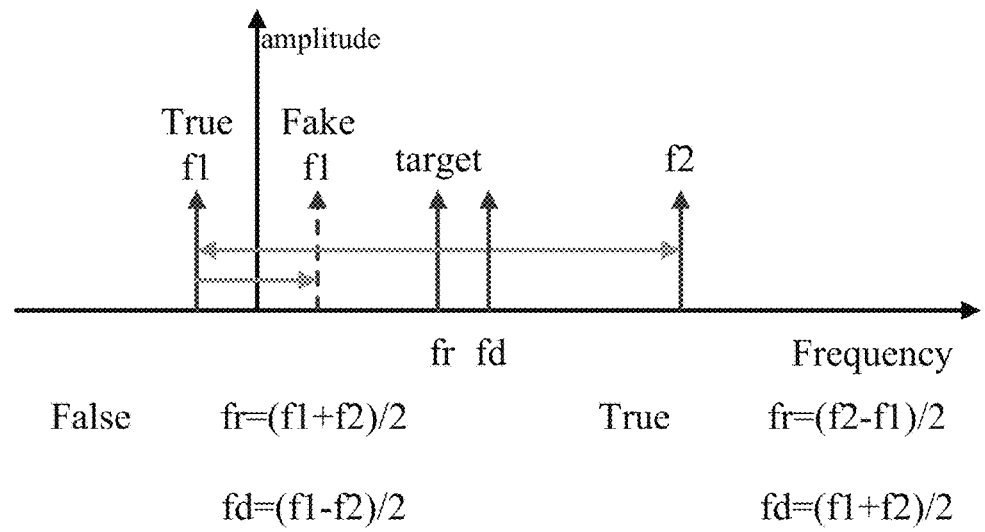
FIG. 1 is a schematic diagram of Doppler aliasing provided in an embodiment of the present application.

The terms "first", "second", etc. are used to distinguish identical or similar items with substantially the same effects and functions. There is no logical or temporal dependency between "first", "second", and "nth", nor are there any limitations on quantity and execution order.

FMCW LiDAR: The working process of FMCW LiDAR can be simply summarized as follows: the continuous wave obtained by frequency modulation is used as the local oscillator signal and the detection signal, the LiDAR transmits the detection signal, the echo signal is mixed with the local oscillator signal through the receiver, and the beat frequency of the mixed signal is obtained, so as to calculate the required information, such as target distance, direction, height, speed, attitude, and even shape parameters; among them, the echo signal is the signal reflected by the target and received by the FMCW LiDAR.

Local oscillator signal: the local oscillator signal is the reference signal of the detection signal. It has the same time-frequency characteristics as the detection signal, the swept frequency waveform is consistent. The local oscillator signal is used to coherently beat the echo signal formed by the detection signal to obtain a beat signal. The local oscillator signal and the detection signal can be obtained by splitting a beam of light or generated by different lasers.

Beat frequency signal: it refers to the difference frequency signal between the local oscillator signal and the echo signal after coherence, also known as the mixing signal.

Triangular wave swept frequency signal: a triangular wave swept frequency signal refers to a signal whose swept frequency waveform is a triangle shape, or a detection signal whose time-frequency diagram is a triangular waveform.

Continuous Wave (CW): the light source module outputs a wave in a continuous manner rather than in a pulsed manner.

Doppler frequency: the frequency changes of the detection signal or echo signal caused by the radial relative motion of the target object relative to the detector (such as FMCW LiDAR) is the Doppler frequency, also known as the speed beat frequency. The Doppler frequency is related to the radial motion speed of the target relative to the LiDAR. The Doppler frequency is equal to the quotient of twice the radial speed and the wavelength of the detection signal.

In-phase Quadrature (IQ): refers to the process of converting the received RF signal into a baseband signal using a quadrature demodulator. The "IQ" here refers to the two orthogonal components generated during the demodulation process, namely the I path (in-phase component) and the Q path (quadrature component). The quadrature demodulator is a commonly used demodulation device that can convert the RF signal into two orthogonal baseband signals. These two signals can represent the amplitude information and phase information of the original signal respectively. By processing these two baseband signals, the original data information can be restored. IQ reception can make full use of spectrum resources and reduce spectrum waste through orthogonal demodulation. The spectrum ranges of IQ covers (0~2pi), so the frequency of the frequency signal can be positive and negative.

Non-IQ reception: the receiving process does not use an orthogonal modulator to convert the received RF signal into two orthogonal baseband signals, which makes it hard to fully utilize spectrum resources, resulting in low spectrum efficiency. The signal received by non-IQ has no phase information, and the spectrum range is only (0~pi), so the frequency of the frequency signal has no positive or negative distinction, but is presented as a positive value.

The frequency modulated continuous wave LiDAR adopts frequency modulated continuous wave for target detection, and the sweep waveform usually uses saw tooth wave and triangle wave. Considering the system complexity/power consumption/cost, the receiving module usually adopts the non-IQ receiving method. When the local oscillator light and the echo light are coherently beat, there may be a phenomenon of Doppler aliasing, that is, the Doppler beat frequency is greater than the distance beat frequency, so that the measured beat frequency will be mirrored to the positive frequency domain, thereby causing the measured distance and speed errors. This is because the frequency calculation result of the non-IQ receiving method is an absolute value, so there is a situation where the negative frequency is calculated under the IQ receiving system, but a positive frequency measurement value is obtained under the non-IQ reception. This situation will cause subsequent speed and distance calculation errors.

Referring to FIG. 1, f1 and f2 are respectively the frequency values measured by two frequency sweep signals for solving the speed and distance, wherein f1 is less than f2. When the Doppler beat frequency fd is greater than the actual distance beat frequency fr, the calculation method based on the IQ receiving system is to subtract the Doppler beat frequency fd from the distance beat frequency fr, and the result is the negative beat frequency f1; while the calculation method based on the non-IQ receiving system is to subtract the absolute value of the Doppler beat frequency fd from the distance beat frequency fr, and the result is the positive beat frequency f1. When the distance beat frequency fr is greater than the Doppler beat frequency fd, the beat frequency f1 and the beat frequency f2 determined by the non-IQ receiving system and the IQ receiving system are both correct; when the distance beat frequency fr is less than the Doppler beat frequency fd, the beat frequency f1 determined by the non-IQ receiving system is wrong, while the beat frequency f2 is correct, which leads to errors in the calculation of the distance beat frequency and the speed beat frequency in this scenario. Generally, the phenomenon that the beat frequency f1 is mirrored due to the Doppler beat frequency being greater than the distance beat frequency is called Doppler aliasing. When the speed beat frequency of the target object is greater than the distance beat frequency, an artifact will be generated, and the generation of the artifact is the root cause of the error. The technical solution provided by the embodiment of the present application can identify the above-mentioned Doppler aliasing phenomenon in a non-IQ receiving mode, thereby calculating the correct distance and speed of the target object.

The LiDAR detection method provided in the embodiment of the present application is not only applicable to fast, efficient and accurate distance measurement and speed measurement of close-range targets, but also to fast, efficient and accurate distance measurement and speed measurement of long-range targets, and can be applied to any field that requires distance measurement and speed measurement, such as smart transportation, aerospace, resource exploration, urban planning, agricultural development, water conservancy projects, land use, environmental monitoring, metallurgical manufacturing, textile manufacturing, etc. For example, it can be applied to unmanned vehicles, drones, robots, positioning systems, navigation systems, loading and unloading and handling equipment, metallurgical process control equipment, and non-contact measurement equipment.

In an embodiment, the LiDAR includes a light source module, an optical multiplexer, a scanning module, a photoelectric detection module and a signal processing module, and may include an optical amplifier, an optical coupler, an optical circulator, an optical collimator, an optical beam combiner, a power module, a communication module, etc.

In an embodiment, the light source module includes a laser and an optical beam splitter. The laser can be implemented by any laser that can emit a linear frequency-sweeping optical signal in a linear frequency modulation mode, such as a semiconductor laser such as a distributed Bragg reflector (DBR) laser and a distributed feedback (DFB) laser. The optical beam splitter can be any device that can split light to split the signal generated by the laser into a corresponding local oscillator signal and a detection signal according to a preset splitting ratio. For example, the optical beam splitter can be an optical coupler, a spectroscope, or the like.

In an embodiment, the photoelectric detection module is any device that can receive the local oscillator signal corresponding to the light source module, and the echo signal formed by the detection signal corresponding to the light source module reflected by the target object, and output an electrical signal related to the beat signal corresponding to the local oscillator signal of the light source module, so that the signal processing module can obtain the frequencies of the above two beat signals based on the above electrical signal. For example, the photoelectric detection module may include a photodetector. In the process of receiving the above local oscillator signal and the echo signal, the local oscillator signal and the echo signal beat each other in the manner of the free space light signal beat, and the photodetector performs photoelectric conversion on the beat signal, thereby obtaining an electrical signal related to the beat signal. For example, the photoelectric detection module may include an optical mixer and a balanced photo detector (BPD). The optical mixer is used to receive the above local oscillator signal and the echo signal, the local oscillator signal and the echo signal beat each other therein, and the balanced photodetector is used to perform balanced detection on the beat signal, obtaining an electrical signal.

In an embodiment, the optical amplifier may be an optical fiber amplifier, such as an erbium doped fiber application amplifier (EDFA). The optical amplifier may be a semiconductor optical amplifier (SOA).

In an embodiment, the LiDAR includes an analog front end (AFE), which processes the analog signal given by the signal source and digitizes it. Its main functions include the following aspects: signal amplification, frequency conversion, modulation, demodulation, adjacent frequency processing, level adjustment and control, and mixing.

In an embodiment, the optical coupler can be implemented by an optical fiber array or a planar lightwave circuit (PLC) array.

In an embodiment, the signal processing module may include a processor, and may include at least one stage of amplification circuit, an analog-to-digital converter (ADC), a time-to-digital converter (TDC), a memory, etc. The processor may also have its own internal storage space and analog-to-digital conversion function to replace the analog-to-digital converter and the memory.

In an embodiment, the processor may be a central processing unit (CPU), or other general-purpose processors, digital signal processors (DSP), application-specific integrated circuits (ASIC), field-programmable gate arrays (FPGA) or other programmable logic devices, discrete gate or transistor logic devices, discrete hardware components, etc. A general-purpose processor may be a microprocessor or any conventional processor, etc.

In some embodiments, the memory may be an internal storage unit of the laser detection device in some embodiments, such as a hard disk or memory of the laser detection device. The memory may also be an external storage device of the laser detection device in other embodiments, such as a plug-in hard disk, a smart memory card (SMC), a secure digital (SD) card, a flash card, etc. equipped on the laser detection device. Furthermore, the memory may also include both an internal storage unit and an external storage device of the laser detection device. The memory is used to store an operating system, an application program, a boot loader, data and other programs, such as program code of a computer program, etc. The memory may also be used to temporarily store data that has been output or is to be output.

In an embodiment, the amplification circuit may be implemented by a trans-impedance amplifier (TIA).

In an embodiment, the power module may include a power management device, a power interface, etc.

In an embodiment, the communication module can be set as device that can directly or indirectly communicate with other devices by wire or wireless communication. For example, the communication module can provide communication solutions including communication interfaces (for example, Universal Serial Bus (USB)), wired local area networks (LAN), wireless local area networks (WLAN) (for example, Wi-Fi network), Bluetooth, Zigbee, mobile communication networks, global navigation satellite systems (GNSS), frequency modulation (FM), near field communication (NFC), infrared (IR), etc., which are applied to network devices. The communication module may include an antenna, which may have one array element or an antenna array including multiple array elements. The communication module may receive electromagnetic waves through the antenna, frequency modulate and filter the electromagnetic wave signal, and send the processed signal to the processor. The communication module may receive the signal to be sent from the processor, frequency modulate and amplify it, and convert it into electromagnetic waves for radiation through the antenna.

Figure 2:
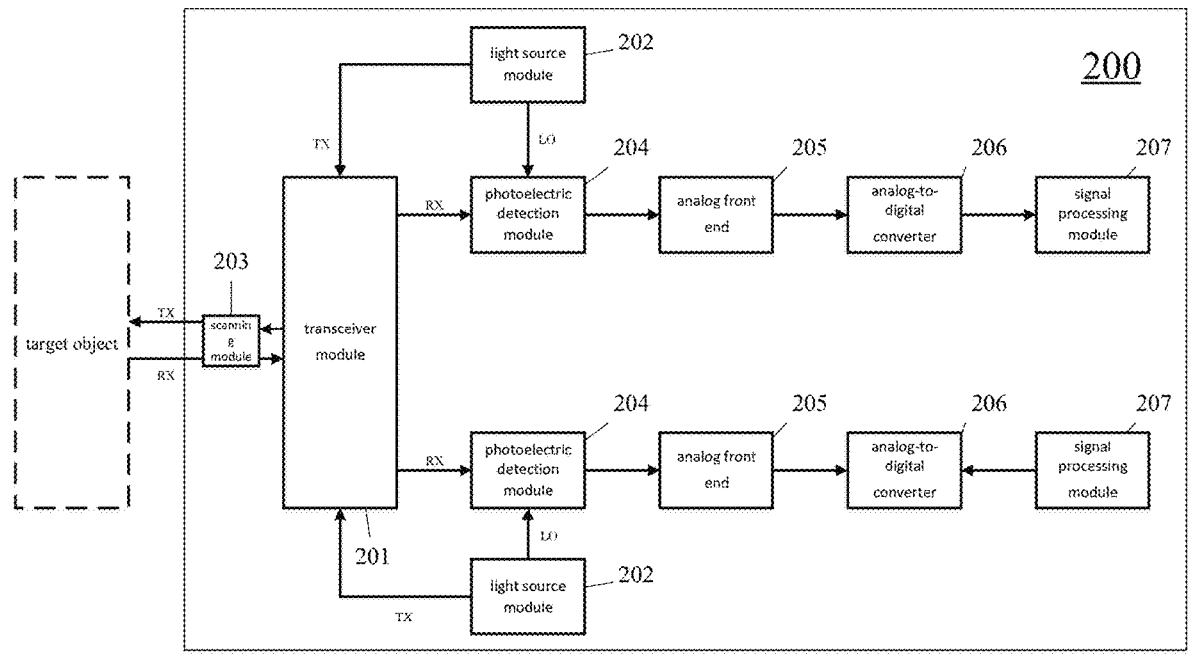
FIG. 2 is a schematic diagram of the structure of a LiDAR provided in some embodiments of the present application.

Refer to FIG. 2, the LiDAR 200 includes a transceiver module 201, a light source module 202, a scanning module 203, a photoelectric detection module 204, an analog front end (AFE) 205, an analog-to-digital converter (ADC) 206, and a signal processing module (Processor) 207.

The light source module 202 is used to generate a detection signal and a local oscillator signal. There are two light source modules 202, and each light source module 202 includes a laser. The transceiver module 201 is used to send the detection signal generated by the light source module 202 to the scanning module 203. The scanning module 203 is used to reflect the detection signal to the target object, and reflect the echo signal formed by the detection signal reflected by the target object to the transceiver module 201. The transceiver module 201 is also used to receive the echo signal reflected by the target object, and send the echo signal to the photoelectric detection module 204. In addition, the photoelectric detection module 204 is also used to receive the local oscillator signal of the light source module 202, so that the echo signal and the local oscillator signal beat to form a beat signal, and perform photoelectric conversion on the beat signal to obtain a corresponding electrical signal. The photoelectric detection module 204 sends the beat signal to the AFE 205, and the AFE 205 filters the beat signal. AFE 205 sends the filtered beat frequency signal to analog-to-digital converter ADC 203, which performs analog-to-digital conversion on the beat frequency signal. ADC 203 inputs the analog-to-digital converted beat frequency signal into signal processing module 207, which calculates the speed and distance of the target object.

Figure 3:
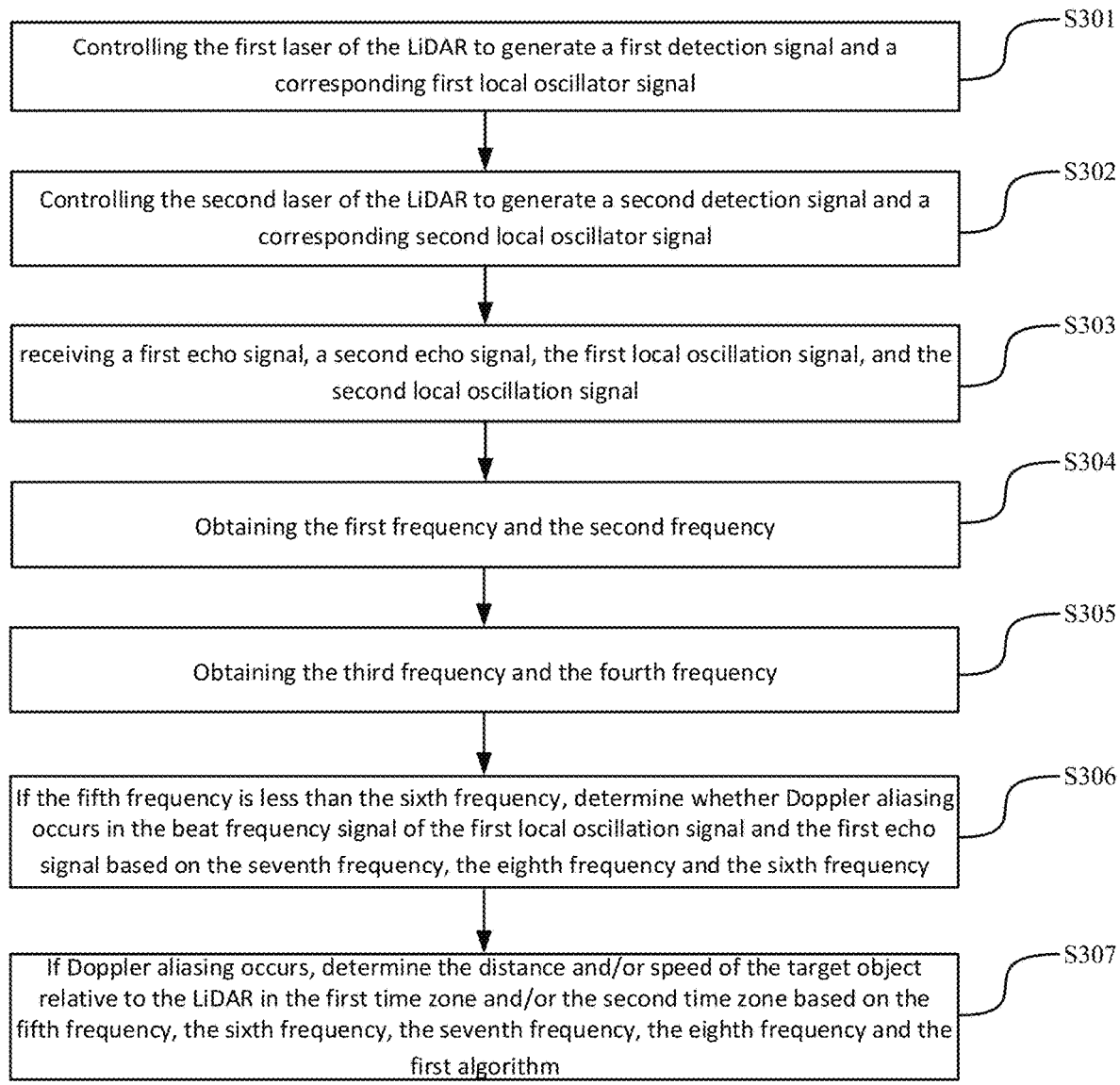
FIG. 3 is a flow chart of a method for LiDAR ranging and speed measurement provided in some embodiments of the present application.

The LiDAR detection method provided in the embodiment of the present application is applied to a frequency modulated continuous wave LiDAR, referring to FIG. 3, and the method includes the following S301 to S307.

S301: Controlling the first laser of the LiDAR to generate a first detection signal and a corresponding first local oscillator signal.

The first local oscillator signal includes multiple segments of first continuous wave signals, and the first continuous wave signal is a linear frequency sweep signal. In an embodiment, the first local oscillator signal and the first detection signal are triangular wave frequency sweep signals as an example, the frequency sweep directions between the two adjacent first continuous wave signals are opposite, the frequency sweep waveforms of the two adjacent first continuous wave signals form a triangular shape, the frequency of the frequency sweep starting point of the first continuous wave signal located in the downstream of the time domain is the same as the frequency of the frequency sweep end point of the first continuous wave signal located in the upstream of the time domain, the first continuous wave is a frequency sweep signal with a complete frequency change in the local oscillator signal. In some embodiments of the present application, the first local oscillator signal and the first detection signal can also be sawtooth wave signals; the frequency sweep directions between the two adjacent first continuous wave signals are the same, the frequency sweep waveforms of the two adjacent first continuous waves form parallel lines, the frequency of the frequency sweep starting point of the first continuous wave signal located in the downstream of the time domain is the same as the frequency of the frequency sweep starting point of the first continuous wave signal located in the upstream of the time domain, the first continuous wave is a complete frequency sweep signal in the local oscillator signal.

S302: Controlling the second laser of the LiDAR to generate a second detection signal and a corresponding second local oscillator signal.

The second local oscillator signal includes multiple segments of second continuous wave signals, and each segment of the second continuous wave signal corresponds to a segment of the first continuous wave signal in the time domain, the LiDAR uses the corresponding first continuous wave and the second continuous wave to detect the target object. The second continuous wave signal includes a first sweep frequency signal and a first constant frequency signal, and the sweep direction of the first sweep frequency signal is opposite to that of the corresponding first continuous wave signal; there is the first constant frequency signal between the first sweep frequency signals of two second continuous wave signals adjacent in the time domain, wherein the first constant frequency signal refers to a signal with a constant frequency. Each segment of the second continuous wave signal corresponds to a segment of the first continuous wave signal in the time domain, which means that for each segment of the second continuous wave signal, there is a segment of the first continuous wave signal, and the starting time and ending time of the segment of the first continuous wave signal are the same as those of the corresponding second continuous wave signal. The first constant frequency signal between the first sweep frequency signals of two second continuous wave signals adjacent in the time domain means that there is a segment of the first constant frequency signal between every two segments of the second continuous wave signals adjacent in the time domain. In an embodiment, in the same second continuous wave, the first constant frequency signal is located downstream of the first frequency sweep signal in the time domain, and the frequency of the first constant frequency signal is the same as the frequency of the frequency sweep end point of the first frequency sweep signal adjacent to the upstream in the time domain, and the frequency of the frequency sweep start point of the first frequency sweep signal adjacent to the downstream in the time domain; the frequency change of the second continuous wave is continuous. In some embodiments, the frequency of the first constant frequency signal may be located upstream of the first frequency sweep signal in the time domain in the same second continuous wave, and its frequency may be different from that of the first constant frequency signal.

In the dual laser detection method, the wavelengths of the detection signals emitted by the two lasers, that is, the first detection signal and the second detection signal, should be different, that is, the frequencies of the first detection signal and the second detection signal should be different to avoid coherent beat frequency between the signals corresponding to the two lasers. In some embodiments, the first detection signal and the second detection signal are both optical signals in the 1550 nanometer (nm) band, but the difference in wavelength between the two is between 0.15 nm and 0.50 nm to achieve the above purpose.

S303: receiving a first echo signal, a second echo signal, the first local oscillation signal, and the second local oscillation signal.

The first echo signal is formed by the reflection of the first detection signal via the target object, and the second echo signal is formed by the reflection of the second detection signal via the target object. The first echo signal and the first local oscillator signal can be received by a photoelectric detection module so that the two beat to generate a first beat signal, and the corresponding electrical signal is obtained by photoelectric conversion; the second echo signal and the second local oscillator signal can be received by another photoelectric detection module so that the two beat to generate a second beat signal, and the corresponding electrical signal is obtained by photoelectric conversion.

S304: Obtaining the first frequency and the second frequency.

The first frequency is the beat frequency of the first local oscillator signal in the first time zone, the second frequency is the beat frequency of the second local oscillator signal in the first time zone, and the first time zone is the time domain interval where the first sweep frequency signal is located. In some embodiments, the first time zone is referred to as the Far-Detect Time Zone. The first local oscillator signal and the second local oscillator signal in the first time zone are sweep frequency signals, and the sweep frequency directions are opposite.

S305: Obtaining the third frequency and the fourth frequency.

The third frequency is the beat frequency of the first local oscillator signal in the second time zone, the fourth frequency is the beat frequency of the second local oscillator signal in the second time zone, and the second time zone is the time domain interval where the first constant frequency signal is located. In some embodiments, the second time zone is called the near-detect time zone. When the target object is at a close distance and high speed relative to the LiDAR, the Doppler beat frequency may be higher than the distance beat frequency, that is, the above-mentioned Doppler aliasing; the frequency corresponding to the second time zone can be used to assist in distinguishing whether Doppler aliasing occurs, so the second time zone is called the near-detection time zone. The part of the first local oscillator signal in the second time zone is still a swept frequency signal (part of the first continuous wave signal), and the part of the second local oscillator signal in the second time zone is a constant frequency signal (first constant frequency signal).

S306: If the fifth frequency is less than the sixth frequency, determine whether Doppler aliasing occurs in the beat frequency signal of the first local oscillation signal and the first echo signal based on the seventh frequency, the eighth frequency and the sixth frequency.

The fifth frequency is one of the third frequencies, the sixth frequency is one of the fourth frequencies and corresponds to the same second time zone as the fifth frequency. The seventh frequency is located in the first time zone adjacent to the fifth frequency in the time domain, and the seventh frequency has the same frequency sweep direction as the fifth frequency; that is, the seventh frequency and the fifth frequency can be located on the same first continuous wave, or on two adjacent first continuous waves. The eighth frequency and the seventh frequency are located in the same first time zone, and the eighth frequency has the opposite frequency sweep direction as the fifth frequency; that is, the eighth frequency is the frequency corresponding to a first frequency sweep signal.

S307: If Doppler aliasing occurs, determine the distance and/or speed of the target object relative to the LiDAR in the first time zone and/or the second time zone based on the fifth frequency, the sixth frequency, the seventh frequency, the eighth frequency and the first algorithm.

The first algorithm is configured as an algorithm that can calculate the distance and/or speed of the target object relative to the LiDAR when Doppler aliasing occurs. If Doppler aliasing occurs, it means that if the speed beat frequency and distance beat frequency of the target object calculated according to the normal algorithm are wrong, the correct speed beat frequency and distance beat frequency can be calculated according to the first algorithm, thereby determining the correct distance and/or speed of the target object relative to the LiDAR.

Through the technical solution provided in the embodiment of the present application, to determine whether Doppler aliasing occurs based on the fifth frequency, the sixth frequency, the seventh frequency and the eighth frequency. When Doppler aliasing occurs, the first algorithm is used to calculate the distance and/or speed of the target object relative to the LiDAR, thereby improving the accuracy of the LiDAR ranging and speed measurement.

Figure 4:
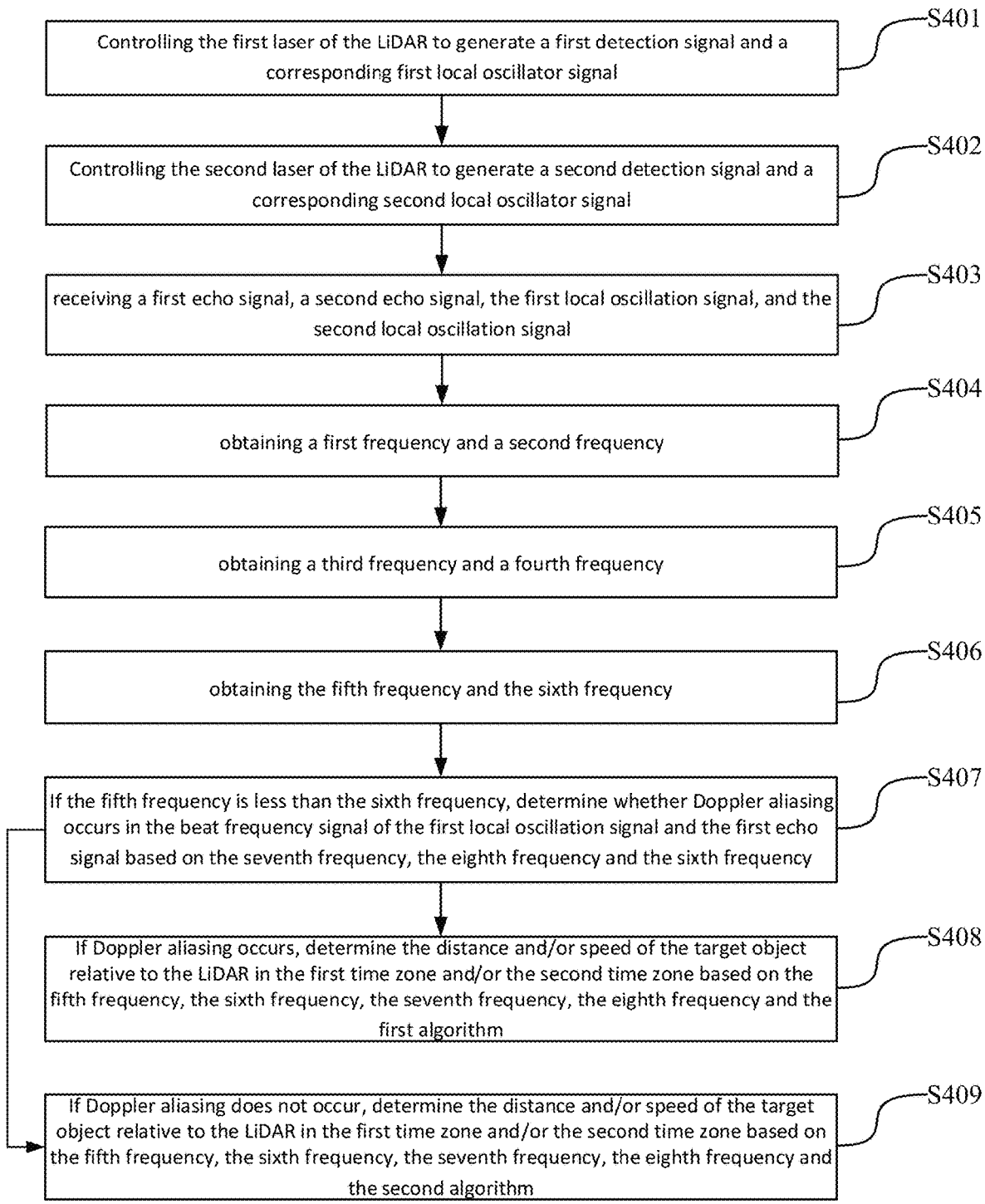
FIG. 4 is a flow chart of a method for LiDAR ranging and speed measurement provided in some other embodiments of the present application.

Referring to FIG. 4, a method includes the following steps.

S401: Controlling the first laser of the LiDAR to generate a first detection signal and a corresponding first local oscillator signal.

The LiDAR is a frequency modulated continuous wave LiDAR, which includes a first laser and a second laser; wherein the first laser is used to generate a first detection signal and a first local oscillator signal. The first detection signal is a signal used to detect a target object, and the first local oscillator signal is a reference signal of the first detection signal. The first local oscillator signal and the first detection signal have the same time-frequency characteristics, that is, the swept waveform is consistent. The first local oscillator signal includes multiple segments of first continuous wave signals, and the first continuous wave signals are linear swept signals; between two adjacent segments of the first continuous wave signals, the first continuous wave signal located downstream in the time domain either has a different sweep direction from the first continuous wave upstream in the time domain, or the frequency of the sweep start point is different from the frequency of the sweep end point of the first continuous wave upstream in the time domain, that is, the two adjacent segments of the first continuous wave are not collinear in the time-frequency diagram.

In some embodiments, the first local oscillator signal is a triangular wave frequency sweep signal, and the frequency sweep directions of two adjacent first continuous wave signals are opposite. A triangular wave frequency sweep signal refers to a waveform in which the frequency of the first local oscillator signal changes with time and is a triangular waveform. Two adjacent first continuous wave signals refer to two adjacent first continuous wave signals in the time domain, and the frequency sweep directions of these two first continuous wave signals are opposite, which means that these two first continuous wave signals include an upper frequency sweep signal and a lower frequency sweep signal. In some embodiments, the frequency sweep slopes of these two first continuous wave signals are the same in magnitude and the frequency sweep directions are opposite. In some embodiments, in addition to being a triangular wave frequency sweep signal, the first local oscillator signal can also be a sawtooth wave signal or a combination of a triangular wave frequency sweep signal and a sawtooth wave signal, as long as the frequency sweep slopes of the first local oscillator signal and the second local oscillator signal in the same first time zone are different in magnitude and/or direction, so that the first local oscillator signal and the second local oscillator signal can cooperate to decouple.

The sweep slope and sweep period of the first detection signal and the first local oscillator signal are set.

S402: Controlling the second laser of the LiDAR to generate a second detection signal and a corresponding second local oscillator signal.

Figure 5:
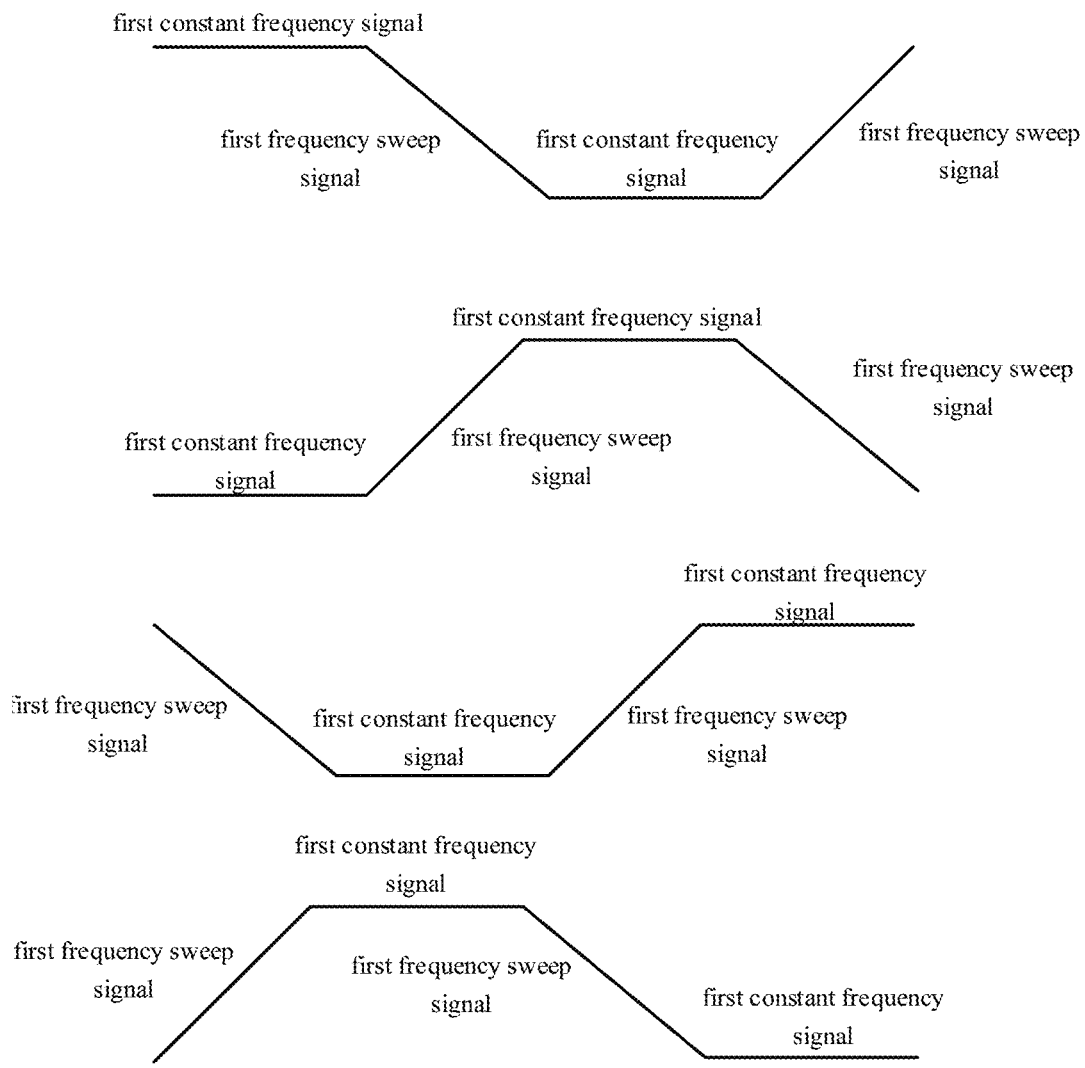
FIG. 5 is a time-frequency diagram of a second local oscillator signal in some embodiments of the present application.

Wherein, the second laser is used to generate a second detection signal and a second local oscillator signal. The second detection signal is a signal used to detect the target object, and the second local oscillator signal is a reference signal for the second detection signal. The second local oscillator signal and the second detection signal have the same time-frequency characteristics, that is, the swept frequency waveform is consistent. The second local oscillator signal includes multiple segments of second continuous wave signals, and each segment of the second continuous wave signal corresponds to a segment of the first continuous wave signal in the time domain. The second continuous wave signal includes a first swept frequency signal and a first constant frequency signal; the first swept frequency signal and the corresponding first continuous wave signal have opposite sweep directions, and the first constant frequency signal exists between the first swept frequency signals of two second continuous wave signals adjacent in the time domain. The correspondence between each segment of the second continuous wave signal and a segment of the first continuous wave signal in the time domain means that for each segment of the second continuous wave signal, there is a segment of the first continuous wave signal, and the start time and end time of the segment of the first continuous wave signal are the same as those of the corresponding second continuous wave signal. The first constant frequency signal is present between the first frequency sweep signals of two second continuous wave signals adjacent in the time domain, which means that there is a first constant frequency signal between every two segments of second continuous wave signals adjacent in the time domain, and correspondingly, there is a second continuous wave signal between every two segments of first constant frequency signals adjacent in the time domain. Refer to FIG. 5, which shows a variety of implementation methods of the time-frequency diagram of the second local oscillator signal. The second local oscillator signal can be the beginning of the first frequency sweep signal or the beginning of the first constant frequency signal. In an embodiment, the second local oscillator signal is taken as the beginning of the first frequency sweep signal.

Figure 6:
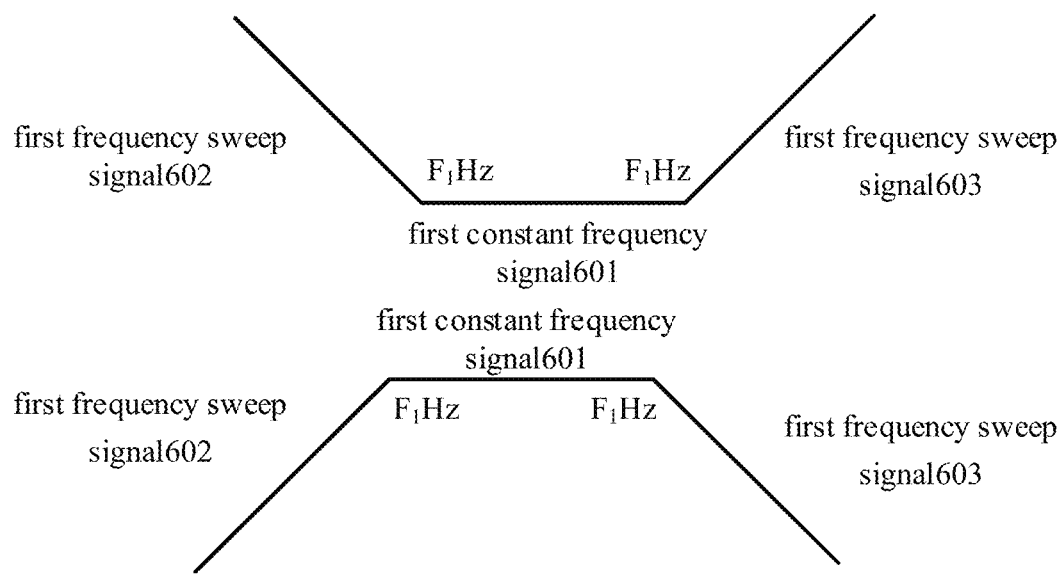
FIG. 6 is a time-frequency diagram of a second local oscillator signal in some embodiments of the present application.

In some embodiments, the frequency of the first constant frequency signal is the same as the frequency of the frequency sweep end point of the first frequency sweep signal adjacent to the upstream of the time domain, and the same as the frequency of the frequency sweep start point of the first frequency sweep signal adjacent to the downstream of the time domain. This setting is intended to make the frequency changes of the second detection signal and the second local oscillator signal continuous, thereby facilitating frequency modulation. For example, see FIG. 6, which shows a variety of implementations of the time-frequency diagram of the second local oscillator signal in some embodiments, the first frequency sweep signal 602 upstream of the first constant frequency signal 601 in the time domain is a down-sweep signal and the frequency of the frequency sweep end point is F1 Hz, the frequency of the first constant frequency signal 601 is also F1 Hz, the frequency of the frequency sweep start point of the first frequency sweep signal 603 downstream of the first constant frequency signal 601 in the time domain is also F1 Hz, and the first frequency sweep signal 602, the first constant frequency signal 601 and the first frequency sweep signal 603 form three-segment signals with continuous frequencies.

Figure 7:
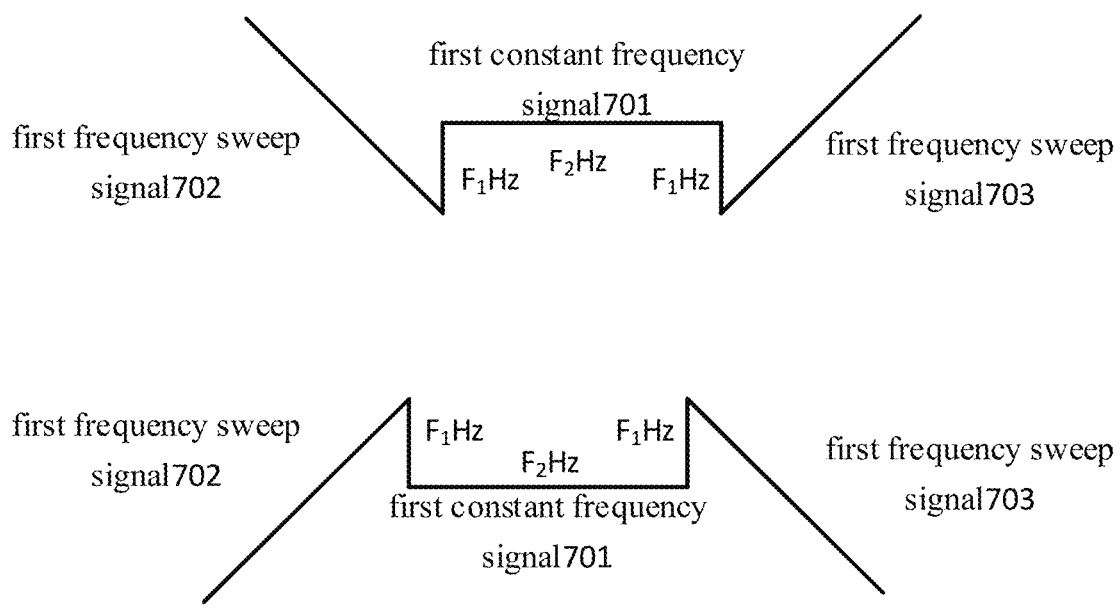
FIG. 7 is a time-frequency diagram of a second local oscillator signal in some embodiments of the present application.

In some embodiments, the frequency of the first constant frequency signal may be different from the frequency of the frequency sweep end point of the first sweep frequency signal adjacent to the upstream of the time domain, and may be different from the frequency of the frequency sweep start point of the first sweep frequency signal adjacent to the downstream of the time domain, and the frequency of the frequency sweep end point of the first sweep frequency signal adjacent to the upstream of the time domain is the same as the frequency of the frequency sweep start point of the first sweep frequency signal adjacent to the downstream of the time domain. For example, refer to FIG. 7, which shows a variety of implementations of the time-frequency diagram of the second local oscillator signal in some embodiments, the frequency of the frequency sweep end point of the first sweep frequency signal 702 upstream of the first constant frequency signal 701 in the time domain is F1 Hz, the frequency of the first constant frequency signal 701 is F2 Hz, the frequency of the frequency sweep start point of the first sweep frequency signal 703 downstream of the first constant frequency signal 701 in the time domain is also F1 Hz, F1 is not equal to F2, and the first sweep frequency signal 702, the first constant frequency signal 701 and the first sweep frequency signal 703 form three-segment signals with frequency hopping.

S403: receiving a first echo signal, a second echo signal, the first local oscillation signal, and the second local oscillation signal.

The first echo signal is formed when the first detection signal is reflected by the target object, and the second echo signal is formed when the second detection signal is reflected by the target object.

In an embodiment, the first echo signal and the first local oscillator signal, as well as the second echo signal and the second local oscillator signal are received by two photoelectric detection modules 204 of the LiDAR, respectively, wherein the first echo signal and the second echo signal are received by the transceiver module 201 and sent to the two photoelectric detection modules 204, respectively, and the first local oscillator signal and the second local oscillator signal are sent to the two photoelectric detection modules by the light source module 202. The same photoelectric detection module only receives the echo signal and local oscillator signal of one light source module (laser).

S404: obtaining a first frequency and a second frequency.

The first frequency is the beat frequency of the first local oscillator signal in the first time zone, the second frequency is the beat frequency of the second local oscillator signal in the first time zone, and the first time zone is the time domain interval where the first frequency sweep signal is located. The beat frequency of the first local oscillator signal in the first time zone is the frequency of the first local oscillator signal after beating with the first echo signal in the first time zone. The beat frequency of the second local oscillator signal in the first time zone is the frequency of the second local oscillator signal after beating with the second echo signal in the first time zone.

Figure 8:
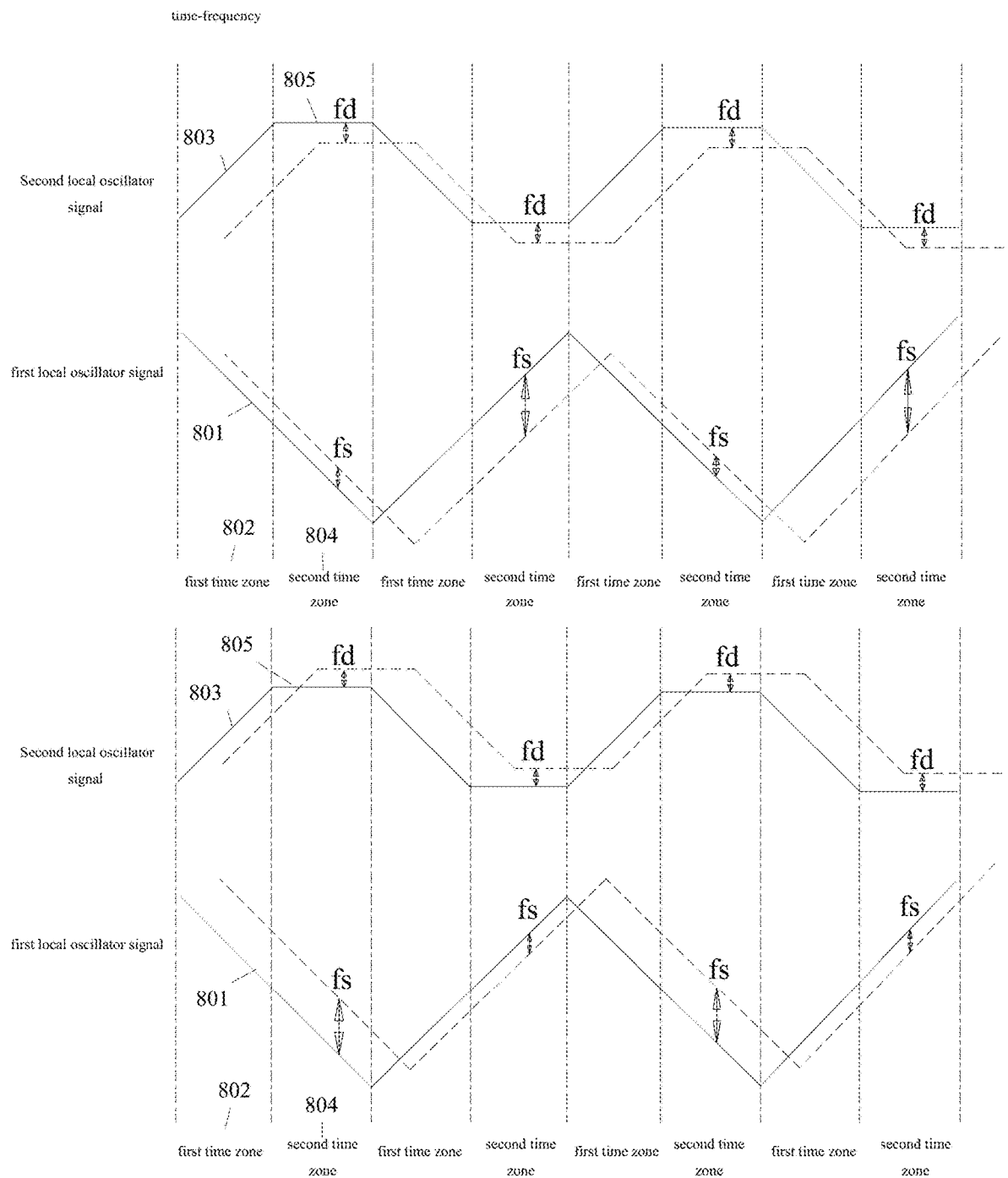
FIG. 8 is a time-frequency diagram of a swept frequency signal and an echo signal provided in some embodiments of the present application.
Figure 9:
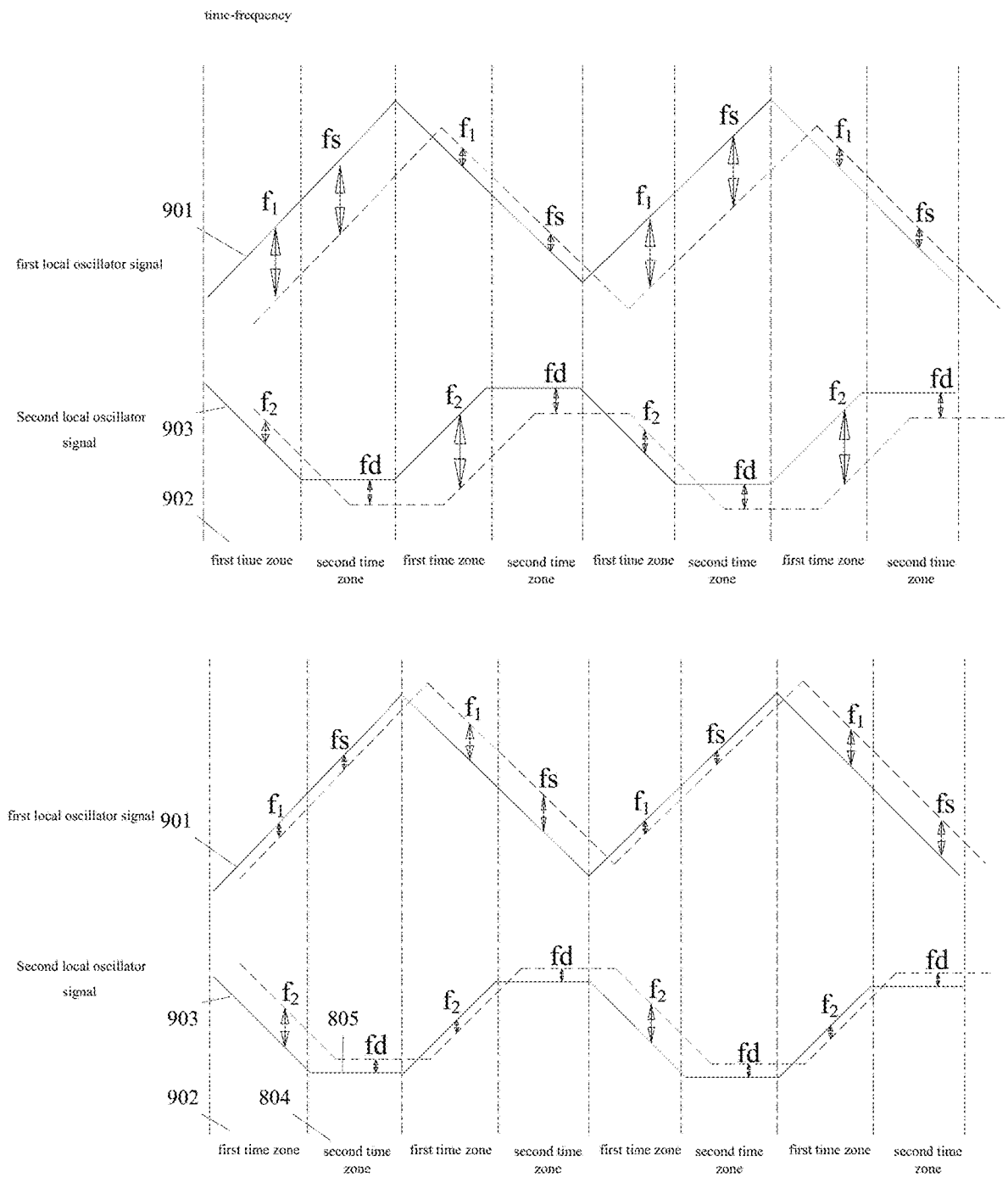
FIG. 9 is a time-frequency diagram of a swept frequency signal and an echo signal provided in some embodiments of the present application.

In some embodiments, the first time zone is referred to as a far detection time zone. In the first time zone, the first local oscillator signal and the second local oscillator signal are both frequency sweep signals, and the frequency sweep directions of the first local oscillator signal and the second local oscillator signal are opposite, that is, in the same first time zone, the frequency sweep directions of the first continuous wave signal in the first local oscillator signal and the second continuous wave signal in the second local oscillator signal are opposite.

where the first local oscillator signal is a triangular wave frequency sweep signal, the second local oscillator signal is a combination of a frequency sweep signal and a constant frequency signal, and the first continuous wave signal in the first local oscillator signal is a down-sweep signal as an example, see FIG. 8, in which the solid line is the first local oscillator signal or the second local oscillator signal, and the dotted line is the first echo signal or the second echo signal. The first continuous wave signal 801 is a down-sweep signal in the first time zone 802, the second continuous wave signal is a first frequency sweep signal 803 in the first time zone 802, and the first frequency sweep signal 803 is an up-sweep signal.

Where the first local oscillator signal is a triangular wave frequency sweep signal, the second local oscillator signal is a combination of a frequency sweep signal and a constant frequency signal, and the first continuous wave signal in the first local oscillator signal is an upper frequency sweep signal as an example, see FIG. 9, in which the solid line is the first local oscillator signal or the second local oscillator signal, and the dotted line is the first echo signal or the second echo signal. The first continuous wave signal 901 is an upper frequency sweep signal in the first time zone 902. In FIG. 8 and FIG. 9, the first frequency is f1 and the second frequency is f2, and there are multiple f1s and multiple f2s.

S405: obtaining a third frequency and a fourth frequency.

The third frequency is the beat frequency of the first local oscillator signal in the second time zone, the fourth frequency is the beat frequency of the second local oscillator signal in the second time zone, and the second time zone is the time domain interval where the first constant frequency signal is located. The beat frequency of the first local oscillator signal in the second time zone is the frequency of the first local oscillator signal after beating with the first echo signal in the second time zone. The beat frequency of the second local oscillator signal in the second time zone is the frequency of the second local oscillator signal after beating with the second echo signal in the second time zone.

In some embodiments, the second time zone is referred to as a close-range detection time zone. In the second time zone, the first local oscillator signal is still a swept frequency signal (first continuous wave signal), and the second local oscillator signal is a constant frequency signal (first constant frequency signal); that is, in the second time zone, there is one swept frequency signal and one constant frequency signal. In the embodiment of the present application, the first time zone and the second time zone are arranged alternately, that is, there is a second time zone between any two adjacent first time zones, and there is a first time zone between any two adjacent second time zones.

Where the first local oscillator signal is a triangular wave swept frequency signal, the second local oscillator signal is a combination of a swept frequency signal and a constant frequency signal, and the first continuous wave signal in the first local oscillator signal is a down swept frequency signal, see FIG. 8, the first continuous wave signal 801 is a down swept frequency signal in the second time zone 804, and the second continuous wave signal is a first constant frequency signal 805 in the second time zone 804, and the frequency of the first constant frequency signal 805 is the frequency of the sweep end point of the first swept frequency signal 803.

Taking the case where the first local oscillator signal is a triangular wave frequency sweep signal, the second local oscillator signal is a combination of a frequency sweep signal and a constant frequency signal, and the first continuous wave signal in the first local oscillator signal is an upper frequency sweep signal as an example, referring to FIG. 9, the first continuous wave signal 901 is an upper frequency sweep signal in the second time zone 904, and the second continuous wave signal is a first constant frequency signal 905 in the second time zone 904, and the frequency of the first constant frequency signal 905 is the frequency of the frequency sweep end point of the first frequency sweep signal 903. In FIG. 8 and FIG. 9, the third frequency is f s and the fourth frequency is fd, and it can be seen that there are multiple fs and multiple fd.

If there is no first echo signal and second echo signal in the second time zone, there will be no third frequency because the frequencies of the first local oscillator signal and the second local oscillator signal are very far from the frequency passband of the coherent reception of the photoelectric detection module. In some embodiments, if the third frequency is not obtained, the third frequency is determined based on the ninth frequency and the tenth frequency. And/or, if the fourth frequency is not obtained, the fourth frequency is determined based on the eleventh frequency and the twelfth frequency.

The ninth frequency is located in the first time zone upstream of the third frequency in the time domain, and the ninth frequency has the same frequency sweep direction as the third frequency. The tenth frequency is located in the first time zone downstream of the third frequency in the time domain, and the tenth frequency has the same frequency sweep direction as the third frequency. The eleventh frequency is located in the second time zone upstream of the fourth frequency in the time domain, and the twelfth frequency is located in the second time zone downstream of the fourth frequency in the time domain.

In an embodiment, if the third frequency is not obtained, the third frequency can be determined based on the ninth and tenth frequencies that are adjacent to the second time zone where the third frequency is located in the time domain. For example, the ninth and tenth frequencies can be averaged to take the average as the third frequency; the ninth and tenth frequencies can be interpolated by weighting or other methods to take the obtained result as the third frequency, so as to complete the point cloud. If the fourth frequency is not obtained, the fourth frequency can be determined based on the eleventh and twelfth frequencies that are adjacent to the second time zone where the fourth frequency is located in the time domain. The determination method refers to the determination method of the third frequency mentioned above. In some embodiments, if the fourth frequency is not obtained, the fourth frequency can be determined based on the eleventh and twelfth frequencies of the two first time zones that are adjacent to the second time zone where the fourth frequency is located in the time domain. The first and second frequencies are opposite to the sweep direction of the third frequency mentioned above; at this time, the purpose is to complete the point cloud at that location.

Optionally, after the above step 405, the following steps can be performed.

In some embodiments, the beat frequency signals corresponding to the first local oscillator signal and the second local oscillator signal are sampled, wherein the sampling rate or FFT point number of the beat frequency signal corresponding to the first local oscillator signal in the second time zone is smaller than that in the first time zone, and the sampling rate or FFT point number of the beat frequency signal corresponding to the second local oscillator signal in the second time zone is smaller than that in the first time zone. The FFT (Fast Fourier Transform) point number refers to the number of sample points of the input signal when performing FFT calculation, and this point number determines the frequency resolution of the FFT.

Since the first local oscillator signal and the second local oscillator signal of an embodiment have a first time zone and a second time zone, for a scenario where Doppler aliasing does not occur, the first frequency and the second frequency of the first time zone can be used to decouple the speed and distance, and the decoupling algorithm can be based on the algorithm formula in the relevant technology. Doppler aliasing often occurs when the target object is in a close-range and high-speed state. For a scenario where Doppler aliasing occurs, auxiliary judgment can be made based on the second time zone. Therefore, the sampling of the beat frequency signal of the first local oscillator signal and the second local oscillator signal in the second time zone can also be differentiated for close-range scenarios. Since the energy of the first echo signal and the second echo signal is relatively high in the close-range scenario, the sampling rate of the beat frequency signal of the first local oscillator signal and the second local oscillator signal in the second time zone can be reduced compared to the first time zone to reduce computing power consumption. In addition, the number of FFT points of the beat frequency signal of the first local oscillator signal and the second local oscillator signal in the second time zone can also be reduced, which can also reduce computing power consumption.

S406: obtaining the fifth frequency and the sixth frequency.

The fifth frequency is one of the third frequencies, and the sixth frequency is one of the fourth frequencies and corresponds to the same second time zone as the fifth frequency. That is, there are multiple third frequencies, and the fifth frequency is any third frequency among the multiple third frequencies; there are multiple fourth frequencies, and the sixth frequency is one of the multiple fourth frequencies corresponding to the fifth frequency. Referring to FIG. 8 and FIG. 9, the fifth frequency is any fs among multiple fs, and the sixth frequency is any fd among multiple fd.

S407: If the fifth frequency is less than the sixth frequency, determine whether Doppler aliasing occurs in the beat frequency signal of the first local oscillation signal and the first echo signal based on the seventh frequency, the eighth frequency and the sixth frequency.

The seventh frequency is located in the first time zone adjacent to the fifth frequency in the time domain, the seventh frequency has the same sweep direction as the fifth frequency, and the seventh frequency and the fifth frequency are located on the same first continuous wave; the eighth frequency and the seventh frequency are located in the same first time zone, the eighth frequency and the fifth frequency have opposite sweep directions, and the eighth frequency is a frequency corresponding to a first sweep signal. The seventh frequency is a first frequency among multiple first frequencies, and the eighth frequency is a second frequency among multiple second frequencies.

If the fifth frequency is less than the sixth frequency, Doppler aliasing may occur. Referring to FIGS. 8 and 9, if the fifth frequency is less than the sixth frequency, it means that in the second time zone, the first echo signal moves along the frequency axis toward the first local oscillator signal due to the Doppler frequency shift effect, so that the fifth frequency is less than the corresponding distance beat frequency; the second echo signal also moves along the frequency axis toward the direction close to the first local oscillator signal. When the amplitude of the first echo signal moving along the frequency axis is greater than half of the distance beat frequency, the fifth frequency will be less than the sixth frequency; the above situation applies when the amplitude of the movement is greater than the distance beat frequency. Therefore, as described above, if the fifth frequency is less than the sixth frequency, Doppler aliasing may occur. It is necessary to further determine whether Doppler aliasing occurs based on the seventh frequency, the eighth frequency and the fifth frequency.

In an embodiment, if the fifth frequency is less than the sixth frequency, it is determined whether the similarity between the seventh frequency and the fifth frequency meets a preset condition. If the similarity between the seventh frequency and the fifth frequency meets the preset condition, it is determined whether Doppler aliasing occurs in the beat frequency signal of the first local oscillation signal and the first echo signal based on the seventh frequency, the eighth frequency and the sixth frequency.

The determination of whether the similarity between the seventh frequency and the fifth frequency meets the preset condition is to determine whether the second time zone where the fifth frequency is located and the first time zone where the seventh frequency is located correspond to the same target. If the second time zone where the fifth frequency is located and the first time zone where the seventh frequency is located correspond to the same target, then the fifth frequency and the seventh frequency should be the same; if the second time zone where the fifth frequency is located and the first time zone where the seventh frequency is located correspond to different targets, then the fifth frequency and the seventh frequency should be different.

In an embodiment, the above implementation will be explained in two parts below.

Part 1: If the fifth frequency is less than the sixth frequency, determining whether the similarity between the seventh frequency and the fifth frequency meets a preset condition.

In a possible implementation, if the fifth frequency is less than the sixth frequency, it is determined whether the similarity between the seventh frequency and the fifth frequency is greater than or equal to a first similarity threshold. If the similarity between the seventh frequency and the fifth frequency is greater than or equal to the first similarity threshold, the similarity between the seventh frequency and the fifth frequency meets the preset condition. If the similarity between the seventh frequency and the fifth frequency is less than the first similarity threshold, the similarity between the seventh frequency and the fifth frequency does not meet the preset condition.

The first similarity threshold could be set.

The above-mentioned determination of whether the similarity between the seventh frequency and the fifth frequency meets the preset condition is an optional step, which may be performed or not.

Part 2: If the similarity between the seventh frequency and the fifth frequency meets a preset condition, then based on the seventh frequency, the eighth frequency and the sixth frequency, it is determined whether Doppler aliasing occurs in the beat frequency signal of the first local oscillation signal and the first echo signal.

In a possible implementation, if the similarity between the seventh frequency and the fifth frequency meets a preset condition and the seventh frequency is less than the eighth frequency, then based on the seventh frequency, the eighth frequency and the sixth frequency, it is determined whether Doppler aliasing occurs in the beat frequency signal of the first local oscillator signal and the first echo signal.

Judging whether the seventh frequency is smaller than the eighth frequency is to further accurately judge whether the second time zone where the fifth frequency is located and the first time zone where the seventh frequency is located correspond to the same target. By judging whether the seventh frequency is smaller than the eighth frequency, the confidence level of whether the second time zone where the fifth frequency is located and the first time zone where the seventh frequency is located correspond to the same target can be improved.

The determination of whether the seventh frequency is less than the eighth frequency is an optional step, which may be performed or not.

A embodiment describes a method for determining whether Doppler aliasing occurs in the beat frequency signal of the first local oscillation signal and the first echo signal based on the seventh frequency, the eighth frequency and the sixth frequency in the above implementation manner.

In a possible implementation, the first discrimination parameter and the second discrimination parameter are determined based on the seventh frequency and the eighth frequency. Based on the similarity between the first discrimination parameter and the second discrimination parameter and the sixth frequency, it is determined whether Doppler aliasing occurs between the beat frequency signal of the first local oscillator signal and the first echo signal.

For example, referring to the following formula (1), half of the absolute value of the difference between the seventh frequency and the eighth frequency is determined as the first discrimination parameter, and referring to the following formula (2), half of the absolute value of the sum of the seventh frequency and the eighth frequency is determined as the second discrimination parameter. As can be seen from the above and FIG. 1, when Doppler aliasing does not occur, the sixth frequency and the first discrimination parameter are both equal to the Doppler beat frequency, and the two should be equal or similar; when Doppler aliasing occurs, the sixth frequency and the second discrimination parameter are both equal to the Doppler beat frequency, and the two should be equal or similar. Therefore, when the similarity between the first discrimination parameter and the sixth frequency is greater than or equal to the second similarity threshold, the beat signal of the first local oscillator signal and the first echo signal does not undergo Doppler aliasing. When the similarity between the second discrimination parameter and the sixth frequency is greater than or equal to the second similarity threshold, the beat signal of the first local oscillator signal and the first echo signal undergoes Doppler aliasing.

$$s_1 = |f_1 - f_2|/2 \quad (1)$$

$$s_2 = |f_1 + f_2|/2 \quad (2)$$

$S_1$ is the first discrimination parameter, $f_1$ is the seventh frequency, $f_2$ is the eighth frequency, and $S_2$ is the second discrimination parameter.

In some embodiments, if the fifth frequency is less than the sixth frequency, the direction of movement of the target object relative to the LiDAR is determined based on the scanning direction corresponding to the fifth frequency.

When the fifth frequency is less than the sixth frequency, if the direction corresponding to the fifth frequency is an upward sweep frequency direction, it is determined that the target object is close to the LiDAR. If the direction corresponding to the fifth frequency is a downward sweep frequency direction, it is determined that the target object is far away from the LiDAR.

S408: If Doppler aliasing occurs, determine the distance and/or speed of the target object relative to the LiDAR in the first time zone and/or the second time zone based on the fifth frequency, the sixth frequency, the seventh frequency, the eighth frequency and the first algorithm.

The first algorithm is configured to calculate the distance and/or speed of the target object relative to the LiDAR when Doppler aliasing occurs. If Doppler aliasing occurs, it means that the speed beat frequency and distance beat frequency of the target object calculated according to the normal algorithm are wrong. The correct speed beat frequency and distance beat frequency can be calculated according to the first algorithm, thereby determining the correct distance and/or speed of the target object relative to the LiDAR.

In a possible implementation, if Doppler aliasing occurs, the distance and speed of the target object relative to the LiDAR in the second time zone are determined based on the fifth frequency, the sixth frequency and the first target algorithm. And/or, the distance and speed of the target object relative to the LiDAR in the first time zone are determined based on the seventh frequency, the eighth frequency and the second target algorithm.

The first algorithm includes the first target algorithm and the second target algorithm. The first target algorithm is configured as an algorithm that can calculate the distance and/or speed of the target object relative to the LiDAR based on the fifth frequency and the sixth frequency when Doppler aliasing occurs, and the second target algorithm is configured as an algorithm that can calculate the distance and/or speed of the target object relative to the LiDAR based on the seventh frequency and the eighth frequency when Doppler aliasing occurs.

The above implementation will be explained in two parts below.

Part 1: If Doppler aliasing occurs, the distance and speed of the target object relative to the LiDAR in the second time zone are determined based on the fifth frequency, the sixth frequency and the first target algorithm.

In a possible implementation, if Doppler aliasing occurs, the speed of the target object relative to the LiDAR in the second time zone is determined based on the sixth frequency and the first target algorithm. The range beat frequency of the target object in the second time zone is determined based on the fifth frequency, the sixth frequency and the first target algorithm. The distance of the target object relative to the LiDAR in the second time zone is determined based on the range beat frequency and the first target algorithm.

The sixth frequency is a Doppler beat frequency, which is equivalent to the speed beat frequency of the target object in the second time zone. The first target algorithm includes an algorithm for determining the speed according to the Doppler beat frequency. For example, the sixth frequency is multiplied by the wavelength of the second detection signal and then divided by 2 to obtain the speed of the target object relative to the LiDAR in the second time zone. The above is the process of using the first target algorithm to operate the sixth frequency.

Based on the difference between the sixth frequency and the fifth frequency, the distance beat frequency is determined, and further based on the distance beat frequency and the frequency modulation slope of the first local oscillator signal, the distance of the target object relative to the LiDAR in the second time zone is determined. The first target algorithm is an algorithm that includes determining the distance of the target object based on the sixth frequency, the fifth frequency and the frequency modulation slope of the first local oscillator signal.

The second part determines the distance and speed of the target object relative to the LiDAR in the first time zone based on the seventh frequency, the eighth frequency and the second target algorithm.

In a possible implementation, based on the seventh frequency, the eighth frequency and the second target algorithm, the distance beat frequency and the speed beat frequency of the target object relative to the LiDAR in the first time zone are determined. Based on the distance beat frequency and the speed beat frequency of the target object relative to the LiDAR in the first time zone, the distance and speed of the target object relative to the LiDAR in the first time zone are determined.

For example, referring to the following formula (3), half of the difference between the eighth frequency and the seventh frequency is determined as the distance beat frequency of the target object relative to the LiDAR in the first time zone. Referring to the following formula (4), half of the sum of the eighth frequency and the seventh frequency is determined as the speed beat frequency of the target object relative to the LiDAR in the first time zone. Based on the distance beat frequency and speed beat frequency of the target object relative to the LiDAR in the first time zone, the distance and speed of the target object relative to the LiDAR in the first time zone are determined.

$$f_r=|(f_2-f_1)|/2 \qquad (3)$$

$$f_d=|(f_2+f_1)|/2 \qquad (4)$$

$f_1$ is the seventh frequency, $f_2$ is the eighth frequency, $f_r$ is the distance beat frequency, and $f_d$ is the speed beat frequency.

S409: If Doppler aliasing does not occur, determine the distance and/or speed of the target object relative to the LiDAR in the first time zone and/or the second time zone based on the fifth frequency, the sixth frequency, the seventh frequency, the eighth frequency and the second algorithm.

The second algorithm is configured as an algorithm that can calculate the distance and/or speed of the target object relative to the LiDAR when Doppler aliasing does not occur.

In a possible implementation, if Doppler aliasing does not occur, the distance and speed of the target object relative to the LiDAR in the second time zone are determined based on the fifth frequency, the sixth frequency and the third target algorithm. And/or, the distance and speed of the target object relative to the LiDAR in the first time zone are determined based on the seventh frequency, the eighth frequency and the fourth target algorithm.

The second algorithm includes the third target algorithm and the fourth target algorithm, the third target algorithm is configured as an algorithm that can calculate the distance and/or speed of the target object relative to the LiDAR based on the fifth frequency and the sixth frequency when Doppler aliasing does not occur, and the fourth target algorithm is configured as an algorithm that can calculate the distance and/or speed of the target object relative to the LiDAR based on the seventh frequency and the eighth frequency when Doppler aliasing does not occur.

The above implementation will be explained in two parts below.

Part 1: If Doppler aliasing does not occur, the distance and speed of the target object relative to the LiDAR in the second time zone are determined based on the fifth frequency, the sixth frequency and the third target algorithm.

In a possible implementation, if Doppler aliasing does not occur, the speed of the target object relative to the LiDAR in the second time zone is determined based on the sixth frequency and the third target algorithm. The range beat frequency of the target object in the second time zone is determined based on the fifth frequency and the sixth frequency. The distance of the target object relative to the LiDAR in the second time zone is determined based on the range beat frequency.

The sixth frequency is a Doppler beat frequency, which is equivalent to the speed beat frequency of the target object in the second time zone. The third target algorithm includes an algorithm for determining the speed according to the Doppler beat frequency. For example, the sixth frequency is multiplied by the wavelength of the second detection signal and then divided by 2 to obtain the speed of the target object relative to the LiDAR in the second time zone. The above is the process of using the third target algorithm to calculate the sixth frequency.

Based on the sum of the sixth frequency and the fifth frequency, the distance beat frequency is determined. The distance of the target object relative to the LiDAR in the second time zone is further determined based on the distance beat frequency and the frequency modulation slope of the first local oscillator signal. The third target algorithm is an algorithm that includes determining the distance of the target object based on the sixth frequency, the fifth frequency and the frequency modulation slope of the first local oscillator signal.

The second part determines the distance and speed of the target object relative to the LiDAR in the first time zone based on the seventh frequency, the eighth frequency and the fourth target algorithm.

In a possible implementation, based on the seventh frequency, the eighth frequency and the fourth target algorithm, the distance beat frequency and the speed beat frequency of the target object relative to the LiDAR in the first time zone are determined. Based on the distance beat frequency and the speed beat frequency of the target object relative to the LiDAR in the first time zone, the distance and speed of the target object relative to the LiDAR in the first time zone are determined.

For example, referring to the following formula (5), half of the sum of the eighth frequency and the seventh frequency is determined as the distance beat frequency of the target object relative to the LiDAR in the first time zone. Referring to the following formula (6), half of the difference between the seventh frequency and the eighth frequency is determined as the speed beat frequency of the target object relative to the LiDAR in the first time zone. Based on the distance beat frequency and speed beat frequency of the target object relative to the LiDAR in the first time zone, the distance and speed of the target object relative to the LiDAR in the first time zone are determined.

$$f_r=|(f_2+f_1)|/2 \qquad (5)$$

$$f_d=|(f_1-f_2)|/2 \qquad (6)$$

$f_1$ is the seventh frequency, $f_2$ is the eighth frequency, $f_r$ is the distance beat frequency, and $f_d$ is the speed beat frequency.

The scanning method of the scanning module 203 in an embodiment of the present application is supplemented with explanation. The second detection signal includes a second frequency sweep signal corresponding to the first frequency sweep signal and a second constant frequency signal corresponding to the first constant frequency signal; the scanning module performs first direction scanning and second direction scanning on the combined light signal of the first detection signal and the second detection signal to form a plurality of scanning tracks extending along the first direction and arranged at intervals in the second direction; wherein the first direction intersects with the second direction. Between two adjacent scanning tracks, the direction angle of each second constant frequency signal in one scanning track in the first direction is staggered with the direction angle of each second constant frequency signal in the other scanning track in the first direction.

The first direction may refer to the horizontal direction when the LiDAR is working, and the second direction may refer to the vertical direction when the LiDAR is working. The direction angles of the second constant frequency signals in one scanning track in the first direction are staggered with the direction angles of the second constant frequency signals in another scanning track in the first direction, which means that the generation time of the second constant frequency signals in two adjacent scanning tracks relative to the start time of the current cycle is different.

Figure 10:
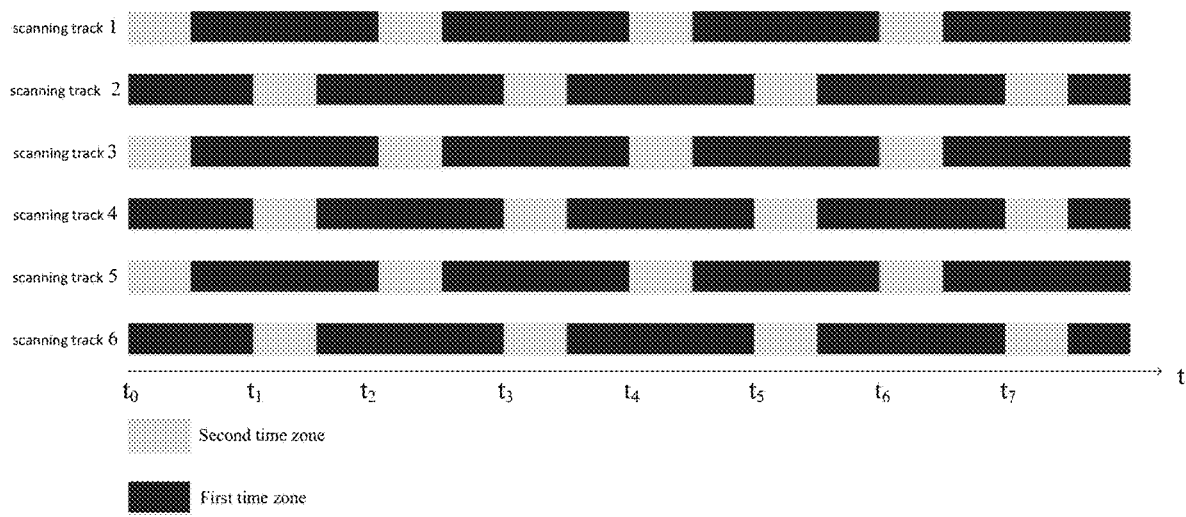
FIG. 10 is a schematic diagram of multiple scanning tracks provided in some embodiments of the present application.

For example, referring to FIG. 10, the scanning module scans and obtains six scanning tracks 1 to 6. For each scanning track itself, the second frequency sweep signal and the second constant frequency signal are alternately arranged in the horizontal direction. For two adjacent scanning tracks 1 and 2, along the horizontal direction, the generation time of each second constant frequency signal in scanning track 1 relative to the start time of this cycle is t0, t2, t4, t6, respectively, and the generation time of each second constant frequency signal in scanning track 2 relative to the start time of this cycle is t1, t3, t5, t7, respectively; when the start time of scanning track 1 and scanning track 2 is regarded as the same time, to, t1, t2, t3, t4, t5, t6, t7 are arranged in sequence. When observing the scanning track, along the horizontal direction, the second constant frequency signal on one scanning track is located between the two adjacent second constant frequency signals of another scanning track; that is, in the scanning pattern formed by the two adjacent scanning tracks, along the horizontal direction, the second constant frequency signals are arranged at intervals. This setting method enables the second constant frequency signal to cover a larger field of view in the horizontal direction, so that the LiDAR can distinguish whether Doppler aliasing occurs in each area of the total detection field of view, which is beneficial to improving the detection performance of the LiDAR. In an embodiment, two scanning tracks constitute a cycle (such as scanning tracks 1 and 2 have different scanning waveforms, and scanning tracks 1 and 3 have the same scanning waveform) as an example for explanation; in some embodiments, the second constant frequency signals in more than three adjacent scanning tracks can be arranged at intervals in the horizontal direction.

All the above optional technical solutions can be combined in any way to form optional embodiments of the present application. In addition, the above is explained by taking the first local oscillator signal as a triangular wave sweep signal as an example, but since the embodiment of the present application is based on the beat signal of the first local oscillator signal and the beat signal of the second local oscillator signal for solution, there is no need to use the two adjacent sweep signals in the first/second local oscillator signal for collaborative solution; therefore, the first local oscillator signal can also be a sawtooth wave signal, in which case the sweep direction, sweep starting frequency and sweep ending frequency of the two adjacent first continuous wave signals are consistent; the sweep waveform of the first local oscillator signal may has multiple first continuous wave signals and the two adjacent first continuous wave signals are not collinear in the time-frequency diagram.

Through the technical solution provided in the embodiment of the present application, to determine whether Doppler aliasing occurs based on the first local oscillator signal generated by the first laser and the second local oscillator signal generated by the second laser, the first local oscillator signal includes multiple segments of first continuous wave signals, the second local oscillator signal includes multiple segments of second continuous wave signals, and the second continuous wave signal includes a first swept frequency signal and a first constant frequency signal. In the event of Doppler aliasing, the first algorithm is used to calculate the distance and/or speed of the target object relative to the LiDAR, thereby improving the accuracy of the LiDAR distance measurement and speed measurement.

Figure 11:
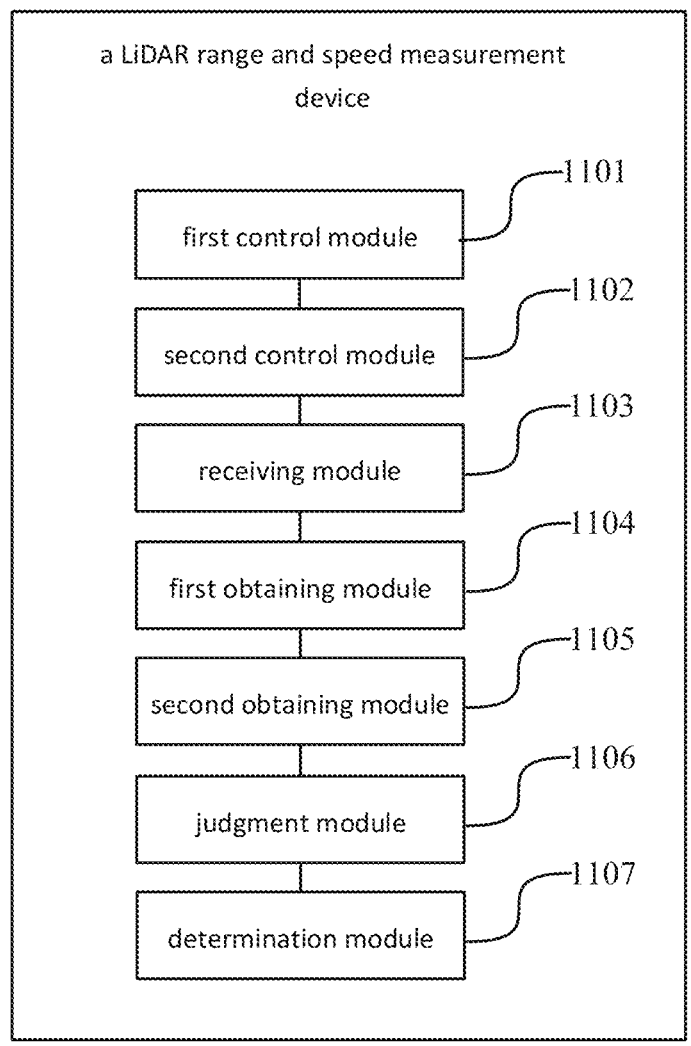
FIG. 11 is a schematic diagram of the structure of a LiDAR ranging and speed measurement device provided in some embodiments of the present application.

FIG. 11 is a schematic diagram of the structure of a LiDAR ranging and speed measurement device provided in an embodiment of the present application. Referring to FIG. 11, the device includes: a first control module 1101, a second control module 1102, a receiving module 1103, a first obtaining module 1104, a second obtaining module 1105, a judgment module 1106 and a determination module 1107.

The first control module 1101 is used to control the first laser of the LiDAR to generate a first detection signal and a corresponding first local oscillator signal, wherein the first local oscillator signal includes multiple segments of first continuous wave signals, and the first continuous wave signal is a linear swept frequency signal.

The second control module 1102 is used to control the second laser of the LiDAR to generate a second detection signal and a corresponding second local oscillator signal, wherein the second local oscillator signal includes multiple segments of second continuous wave signals, each segment of the second continuous wave signal corresponds to a segment of the first continuous wave signal in the time domain, and the second continuous wave signal includes a first sweep frequency signal and a first constant frequency signal, the first sweep frequency signal and the corresponding first continuous wave signal have opposite sweep directions, and the first constant frequency signal exists between the first sweep frequency signals of two adjacent second continuous wave signals in the time domain.

The receiving module 1103 is used to receive a first echo signal, a second echo signal, the first local oscillator signal and the second local oscillator signal, wherein the first echo signal is formed by the first detection signal being reflected by the target object, and the second echo signal is formed by the second detection signal being reflected by the target object.

The first obtaining module 1104 is used to obtain a first frequency and a second frequency, wherein the first frequency is the beat frequency of the first local oscillator signal in a first time zone, the second frequency is the beat frequency of the second local oscillator signal in the first time zone, and the first time zone is the time domain interval where the first frequency sweep signal is located.

The second obtaining module 1105 is used to obtain a third frequency and a fourth frequency, wherein the third frequency is the beat frequency of the first local oscillator signal in a second time zone, and the fourth frequency is the beat frequency of the second local oscillator signal in the second time zone, and the second time zone is the time domain interval where the first constant frequency signal is located.

The judgment module 1106 is used to judge whether Doppler aliasing occurs in the beat frequency signal of the first local oscillator signal and the first echo signal based on the seventh frequency, the eighth frequency and the sixth frequency if the fifth frequency is less than the sixth frequency, wherein the fifth frequency is one of the third frequencies, the sixth frequency is one of the fourth frequencies and corresponds to the same second time zone as the fifth frequency, the seventh frequency is located in the first time zone adjacent to the fifth frequency in the time domain, the seventh frequency has the same sweep direction as the fifth frequency, the eighth frequency and the seventh frequency are located in the same first time zone, and the eighth frequency has the opposite sweep direction to the fifth frequency.

The determination module 1107 is used to determine the distance and/or speed of the target object relative to the LiDAR in the first time zone and/or the second time zone based on the fifth frequency, the sixth frequency, the seventh frequency, the eighth frequency and the first algorithm if Doppler aliasing occurs, wherein the first algorithm is configured to calculate the distance and/or speed of the target object relative to the LiDAR when Doppler aliasing occurs.

In an embodiment, the first local oscillation signal is a triangular wave frequency sweep signal, and the frequency sweep directions of two adjacent first continuous wave signals are opposite.

In an embodiment, the frequency of the first constant frequency signal is the same as the frequency of the sweep end point of the first sweep frequency signal adjacent to the upstream in the time domain, and is the same as the frequency of the sweep start point of the first sweep frequency signal adjacent to the downstream in the time domain.

In an embodiment, the judgment module 1106 is configured to judge whether the similarity between the seventh frequency and the fifth frequency satisfies a preset condition if the fifth frequency is less than the sixth frequency. If the similarity between the seventh frequency and the fifth frequency satisfies the preset condition, it is judged whether Doppler aliasing occurs in the beat frequency signal between the first local oscillation signal and the first echo signal based on the seventh frequency, the eighth frequency and the sixth frequency.

In an embodiment, the judgment module 1106 is used to judge whether Doppler aliasing occurs in the beat frequency signal of the first local oscillator signal and the first echo signal based on the seventh frequency, the eighth frequency and the sixth frequency if the similarity between the seventh frequency and the fifth frequency meets a preset condition and the seventh frequency is less than the eighth frequency.

In an embodiment, the determination module 1107 is used to determine the distance and speed of the target object relative to the LiDAR in the second time zone based on the fifth frequency, the sixth frequency and the first target algorithm. And/or, based on the seventh frequency, the eighth frequency and the second target algorithm, determine the distance and speed of the target object relative to the LiDAR in the first time zone. Wherein, the first algorithm includes the first target algorithm and the second target algorithm, the first target algorithm is configured as an algorithm that can calculate the distance and/or speed of the target object relative to the LiDAR based on the fifth frequency and the sixth frequency when Doppler aliasing occurs, and the second target algorithm is configured as an algorithm that can calculate the distance and/or speed of the target object relative to the LiDAR based on the seventh frequency and the eighth frequency when Doppler aliasing occurs.

In an embodiment, the determination module 1107 is also used to determine the distance and/or speed of the target object relative to the LiDAR in the first time zone and/or second time zone based on the fifth frequency, the sixth frequency, the seventh frequency, the eighth frequency and the second algorithm if Doppler aliasing does not occur, wherein the second algorithm is configured to calculate the distance and/or speed of the target object relative to the LiDAR when Doppler aliasing does not occur.

In an embodiment, the device further includes a direction determination module for determining the direction of movement of the target object relative to the LiDAR based on a sweep direction corresponding to the fifth frequency if the fifth frequency is less than the sixth frequency.

In an embodiment, the direction determination module is used to determine that the target object is close to the LiDAR if the direction corresponding to the fifth frequency is an upward sweep frequency direction, and to determine that the target object is far away from the LiDAR if the direction corresponding to the fifth frequency is a downward sweep frequency direction.

In an embodiment, the second acquisition module 1105 is also used to determine the third frequency based on the ninth frequency and the tenth frequency if the third frequency is not acquired. And/or if the fourth frequency is not acquired, determine the fourth frequency based on the eleventh frequency and the twelfth frequency. Wherein, the ninth frequency is located in the first time zone upstream adjacent to the third frequency in the time domain, the ninth frequency has the same sweep direction corresponding to the third frequency, the tenth frequency is located in the first time zone downstream adjacent to the third frequency in the time domain, and the tenth frequency has the same sweep direction corresponding to the third frequency. The eleventh frequency is located in the second time zone upstream adjacent to the fourth frequency in the time domain, and the twelfth frequency is located in the second time zone downstream adjacent to the fourth frequency in the time domain.

In an embodiment, the second detection signal includes a second frequency sweep signal corresponding to the first frequency sweep signal and a second constant frequency signal corresponding to the first constant frequency signal, and the device further includes a third control module, which is used to control the scanning module to scan the combined light signal of the first detection signal and the second detection signal in the first direction and the second direction, to form a plurality of scanning tracks extending along the first direction and arranged at intervals in the second direction, wherein the first direction intersects with the second direction. Between two adjacent scanning tracks, the direction angle of each second constant frequency signal in one scanning track in the first direction is staggered with the direction angle of each second constant frequency signal in the other scanning track in the first direction.

In an embodiment, the device includes a sampling module for sampling the beat frequency signals corresponding to the first local oscillator signal and the second local oscillator signal respectively, wherein the sampling rate or FFT point number of the beat frequency signal corresponding to the first local oscillator signal in the second time zone is smaller than that in the first time zone, and the sampling rate or FFT point number of the beat frequency signal corresponding to the second local oscillator signal in the second time zone is smaller than that in the first time zone.

The LiDAR ranging and speed measurement device provided in the above embodiment only uses the division of the above functional modules as an example when measuring ranging and speed. The above functions can be assigned to different functional modules based on needs, that is, the internal structure of the computer device is divided into different functional modules to complete all or part of the functions described above. In addition, the LiDAR ranging and speed measurement device provided in the above embodiment and the LiDAR ranging and speed measurement method embodiment belong to the same concept.

Through the technical solution provided in the embodiment of the present application, it is to determine whether Doppler aliasing occurs based on the first local oscillator signal generated by the first laser and the second local oscillator signal generated by the second laser, the first local oscillator signal includes multiple segments of first continuous wave signals, the second local oscillator signal includes multiple segments of second continuous wave signals, and the second continuous wave signal includes a first swept frequency signal and a first constant frequency signal. In the event of Doppler aliasing, the first algorithm is used to calculate the distance and/or speed of the target object relative to the LiDAR, thereby improving the accuracy of the LiDAR distance measurement and speed measurement.

An embodiment of the present application provides a LiDAR, which includes a first laser, a second laser, a photoelectric detection module and a data processing module.

The first laser is used to generate a first detection signal and a corresponding first local oscillator signal, wherein the first local oscillator signal includes a plurality of first continuous wave signals, and the first continuous wave signal is a linear frequency sweep signal.

The second laser is used to generate a second detection signal and a corresponding second local oscillator signal, wherein the second local oscillator signal includes multiple segments of second continuous wave signals, each segment of the second continuous wave signal corresponds to a segment of the first continuous wave signal in the time domain, the second continuous wave signal includes a first sweep frequency signal and a first constant frequency signal, the first sweep frequency signal and the corresponding first continuous wave signal have opposite sweep directions, and the first constant frequency signal is between the first sweep frequency signals of two adjacent second continuous wave signals in the time domain.

The photoelectric detection module is used to receive a first echo signal, a second echo signal, the first local oscillation signal and the second local oscillation signal, the first echo signal is formed by the first detection signal being reflected by a target object, and the second echo signal is formed by the second detection signal being reflected by the target object.

The data processing module is used to obtain a first frequency and a second frequency, wherein the first frequency is the beat frequency of the first local oscillator signal in the first time zone, the second frequency is the beat frequency of the second local oscillator signal in the first time zone, and the first time zone is the time domain interval where the first frequency sweep signal is located. A third frequency and a fourth frequency are obtained, wherein the third frequency is the beat frequency of the first local oscillator signal in the second time zone, the fourth frequency is the beat frequency of the second local oscillator signal in the second time zone, and the second time zone is the time domain interval where the first constant frequency signal is located. If the fifth frequency is less than the sixth frequency, then based on the seventh frequency, the eighth frequency and the sixth frequency, determine whether the beat frequency signal of the first local oscillator signal and the first echo signal has Doppler aliasing, wherein the fifth frequency is one of the third frequencies, the sixth frequency is one of the fourth frequencies and corresponds to the same second time zone as the fifth frequency, the seventh frequency is located in the first time zone adjacent to the fifth frequency in the time domain, the seventh frequency has the same sweep direction as the fifth frequency, the eighth frequency is located in the same first time zone as the seventh frequency, and the eighth frequency has the opposite sweep direction as the fifth frequency. If Doppler aliasing occurs, then the distance and/or speed of the target object relative to the LiDAR in the first time zone and/or the second time zone is determined based on the fifth frequency, the sixth frequency, the seventh frequency, the eighth frequency and the first algorithm, wherein the first algorithm is configured as an algorithm that can calculate the distance and/or speed of the target object relative to the LiDAR when Doppler aliasing occurs.

In an embodiment, a computer-readable storage medium is also provided, such as a memory including a computer program, and the computer program can be executed by a processor to complete the LiDAR ranging and speed measurement method in the above embodiment. For example, the computer-readable storage medium can be a read-only memory (ROM), a random access memory (RAM), a compact disc read-only memory (CD-ROM), a magnetic tape, a floppy disk, an optical data storage device, etc.

In an embodiment, a computer program product or a computer program is also provided, which includes a program code, and the program code is stored in a computer-readable storage medium. A processor of a computer device reads the program code from the computer-readable storage medium, and the processor executes the program code, so that the computer device performs the above-mentioned LiDAR ranging and speed measurement method.

In some embodiments, the computer program involved in the embodiments of the present application may be deployed and executed on a computer device, or on multiple computer devices located at one location, or on multiple computer devices distributed at multiple locations and interconnected by a communication network. Multiple computer devices distributed at multiple locations and interconnected by a communication network may constitute a Blockchain system.

What is claimed is:

1. A LiDAR range and speed measurement method, comprising:
   controlling a first laser of the LiDAR to generate a first detection signal and a corresponding first local oscillator signal, wherein the first local oscillator signal comprises multiple segments of first continuous wave signals, and the first continuous wave signal is a linear frequency sweep signal;
   controlling a second laser of the LiDAR to generate a second detection signal and a corresponding second local oscillator signal, wherein the second local oscillator signal comprises multiple segments of second continuous wave signals, each segment of the second continuous wave signal corresponds to a segment of the first continuous wave signal in the time domain, the second continuous wave signal comprises a first frequency sweep signal and a first constant frequency signal, the first frequency sweep signal and the corresponding first continuous wave signal have opposite frequency sweep directions, and the first constant frequency signal exists between the first frequency sweep signals of two adjacent second continuous wave signals in the time domain;
   receiving a first echo signal, a second echo signal, the first local oscillator signal, and the second local oscillator signal, wherein the first echo signal is formed when the first detection signal is reflected by a target object, and the second echo signal is formed when the second detection signal is reflected by the target object;
   obtaining a first frequency and a second frequency, wherein the first frequency is a beat frequency of the first local oscillator signal in a first time zone, the second frequency is a beat frequency of the second local oscillator signal in the first time zone, and the first time zone is a time domain interval where the first frequency sweep signal is located;

obtaining a third frequency and a fourth frequency, wherein the third frequency is a beat frequency of the first local oscillator signal in a second time zone, and the fourth frequency is a beat frequency of the second local oscillator signal in a second time zone, and the second time zone is a time domain interval where the first constant frequency signal is located;

when a fifth frequency is less than a sixth frequency, determining whether Doppler aliasing occurs in a beat frequency signal of the first local oscillator signal and the first echo signal based on a seventh frequency, an eighth frequency and the sixth frequency, wherein the fifth frequency is one of the third frequencies, the sixth frequency is one of the fourth frequencies and corresponds to the same second time zone as the fifth frequency, the seventh frequency is located in a first time zone adjacent to the fifth frequency in the time domain, the seventh frequency has the same sweep direction as the fifth frequency, the eighth frequency is located in the same first time zone as the seventh frequency, and the eighth frequency has the opposite sweep direction as the fifth frequency; and when Doppler aliasing occurs, determining a distance or speed of the target object relative to the LiDAR in the first time zone or second time zone based on the fifth frequency, the sixth frequency, the seventh frequency, the eighth frequency and the first algorithm, wherein the first algorithm is configured to calculate the distance or speed of the target object relative to the LiDAR when Doppler aliasing occurs.

2. The method according to claim 1, wherein the first local oscillation signal is a triangular wave frequency sweeping signal, and frequency sweeping directions of two adjacent first continuous wave signals are opposite.

3. The method according to claim 2, wherein a frequency of the first constant frequency signal is the same as a frequency of a sweep end point of the first sweep frequency signal located upstream and adjacent to the first constant frequency signal in the time domain, and is the same as a frequency of the sweep start point of the first sweep frequency signal located downstream and adjacent to the first constant frequency signal in the time domain.

4. The method according to claim 1, wherein when the fifth frequency is less than the sixth frequency, determining whether Doppler aliasing occurs in the beat frequency signal of the first local oscillator signal and the first echo signal based on a seventh frequency, an eighth frequency and the sixth frequency, comprises:

when the fifth frequency is less than the sixth frequency, determining whether a similarity between the seventh frequency and the fifth frequency meets a preset condition;

when the similarity between the seventh frequency and the fifth frequency meets a preset condition, determining whether Doppler aliasing occurs in the beat frequency signal of the first local oscillation signal and the first echo signal based on the seventh frequency, the eighth frequency and the sixth frequency.

5. The method according to claim 4, wherein when the similarity between the seventh frequency and the fifth frequency meets a preset condition, determining whether Doppler aliasing occurs in the beat frequency signal of the first local oscillator signal and the first echo signal based on the seventh frequency, the eighth frequency and the sixth frequency, comprises:

when the similarity between the seventh frequency and the fifth frequency meets a preset condition, and the seventh frequency is less than the eighth frequency, determining whether Doppler aliasing occurs in the beat frequency signals of the first local oscillator signal and the first echo signal based on the seventh frequency, the eighth frequency and the sixth frequency.

6. The method according to claim 1, wherein when Doppler aliasing occurs, determining the distance or speed of the target object relative to the LiDAR in the first time zone or second time zone based on the fifth frequency, the sixth frequency, the seventh frequency, the eighth frequency and the first algorithm, comprises:

determining the distance and speed of the target object relative to the LiDAR in the second time zone based on the fifth frequency, the sixth frequency and a first target algorithm; or, determining the distance and speed of the target object relative to the LiDAR in the first time zone based on the seventh frequency, the eighth frequency and a second target algorithm;

wherein the first algorithm comprises the first target algorithm and the second target algorithm, the first target algorithm is configured as an algorithm that can calculate the distance and/or speed of the target object relative to the LiDAR based on the fifth frequency and the sixth frequency when Doppler aliasing occurs, and the second target algorithm is configured as an algorithm that can calculate the distance and/or speed of the target object relative to the LiDAR based on the seventh frequency and the eighth frequency when Doppler aliasing occurs.

7. The method according to claim 1, wherein the method further comprises:

when Doppler aliasing does not occur, determining the distance or speed of the target object relative to the LiDAR in the first time zone or second time zone based on the fifth frequency, the sixth frequency, the seventh frequency, the eighth frequency and the second algorithm, wherein the second algorithm is configured to calculate the distance and/or speed of the target object relative to the LiDAR when Doppler aliasing does not occur.

8. The method according to claim 1, wherein the method further comprises:

when the fifth frequency is less than the sixth frequency, determining the movement direction of the target object relative to the LiDAR based on the sweep direction corresponding to the fifth frequency.

9. The method according to claim 8, wherein determining the movement direction of the target object relative to the LiDAR based on the sweep direction corresponding to the fifth frequency comprises:

when the direction corresponding to the fifth frequency is an upward sweep frequency direction, determining that the target object is close to the LiDAR; and when the direction corresponding to the fifth frequency is a downward sweep frequency direction, determining that the target object is far away from the LiDAR.

10. The method according to claim 1, wherein when the fifth frequency is less than the sixth frequency, before determining whether Doppler aliasing occurs in the beat frequency signal between the first local oscillator signal and the first echo signal based on the seventh frequency, the eighth frequency and the sixth frequency, the method further comprises:

when the third frequency is not obtained, determining the third frequency based on a ninth frequency and a tenth frequency; or the fourth frequency is not obtained, determining the fourth frequency based on a eleventh frequency and a twelfth frequency;

wherein the ninth frequency is located in the first time zone upstream of the third frequency in the time domain, and the ninth frequency has a same corresponding frequency sweeping direction as the third frequency;

the tenth frequency is located in the first time zone downstream of the third frequency in the time domain, and the tenth frequency has a same corresponding frequency sweeping direction as the third frequency;

the eleventh frequency is located in the second time zone upstream of the fourth frequency in the time domain, and the twelfth frequency is located in the second time zone downstream of the fourth frequency in the time domain.

11. The method according to claim 1, wherein the second detection signal comprises a second swept frequency signal corresponding to the first swept frequency signal and a second constant frequency signal corresponding to the first constant frequency signal, and the method further comprises:

controlling the scanning module to scan a combined light signal of the first detection signal and the second detection signal in a first direction and a second direction to form a plurality of scanning tracks extending along the first direction and arranged at intervals in the second direction, wherein the first direction intersects with the second direction;

wherein between two adjacent scanning tracks, a direction angle of each second constant frequency signal in one scanning track in the first direction is staggered with a direction angle of each second constant frequency signal in the other scanning track in the first direction.

12. The method according to claim 1, wherein the method further comprises:

sampling the beat frequency signals corresponding to the first local oscillator signal and the second local oscillator signal respectively, wherein the sampling rate or the number of FFT points of the beat frequency signal corresponding to the first local oscillator signal in the second time zone is smaller than that in the first time zone, and the sampling rate or the number of FFT points of the beat frequency signal corresponding to the second local oscillator signal in the second time zone is smaller than that in the first time zone.

13. A LiDAR, comprising:

a first laser, a second laser, a photoelectric detection module and a data processing module;

wherein the first laser is configured to generate a first detection signal and a corresponding first local oscillator signal, wherein the first local oscillator signal comprises multiple segments of first continuous wave signals, and the first continuous wave signal is a linear frequency sweep signal;

the second laser is configured to generate a second detection signal and a corresponding second local oscillator signal, wherein the second local oscillator signal comprises multiple segments of second continuous wave signals, each of which corresponds to one first continuous wave signal in the time domain, and the second continuous wave signal comprises a first frequency sweep signal and a first constant frequency signal, the first frequency sweep signal and the corresponding first continuous wave signal have opposite frequency sweep directions, and the first constant frequency signal exists between the first frequency sweep signals of two adjacent second continuous wave signals in the time domain;

the photoelectric detection module is configured to receive a first echo signal, a second echo signal, the first local oscillator signal and the second local oscillator signal, wherein the first echo signal is formed by the first detection signal being reflected by a target object, and the second echo signal is formed by the second detection signal being reflected by the target object; and the data processing module is configured to:

obtain a first frequency and a second frequency, wherein the first frequency is a beat frequency of the first local oscillator signal in the first time zone, the second frequency is a beat frequency of the second local oscillator signal in the first time zone, and the first time zone is a time domain interval where the first swept frequency signal is located;

obtain a third frequency and a fourth frequency, wherein the third frequency is a beat frequency of the first local oscillator signal in the second time zone, the fourth frequency is a beat frequency of the second local oscillator signal in the second time zone, and the second time zone is a time domain interval where the first constant frequency signal is located;

determine whether Doppler aliasing occurs in a beat frequency signal of the first local oscillator signal and the first echo signal based on the seventh frequency, the eighth frequency and the sixth frequency, when the fifth frequency is less than the sixth frequency, wherein the fifth frequency is one of the third frequencies, the sixth frequency is one of the fourth frequencies and corresponds to the same second time zone as the fifth frequency, the seventh frequency is located in the first time zone adjacent to the fifth frequency in the time domain, and the seventh frequency has the same sweep direction as the fifth frequency, the eighth frequency and the seventh frequency are located in the same first time zone, and the eighth frequency has an opposite sweep direction to the fifth frequency; and determine a distance or speed of the target object relative to the LiDAR in the first time zone or the second time zone based on the fifth frequency, the sixth frequency, the seventh frequency, the eighth frequency and the first algorithm, when Doppler aliasing occurs, is determined wherein the first algorithm is configured as an algorithm that can calculate the distance or speed of the target object relative to the LiDAR when Doppler aliasing occurs.

* * * * *